US012693110B2

(12) United States Patent     (10) Patent No.:   US 12,693,110 B2
Sisco     (45) Date of Patent:     Jul. 28, 2026

(54) NON-CONTACT AUTOMATED MEASUREMENT FOR INTERFACE GAPS

(71) Applicant: The Boeing Company, Arlington, VA (US)

(72) Inventor: Farahnaz Sisco, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 568 days.

(21) Appl. No.: 18/299,170

(22) Filed: Apr. 12, 2023

(65) Prior Publication Data

US 2023/0271281 A1     Aug. 31, 2023

Related U.S. Application Data

(63) Continuation-in-part of application No. 17/567,674, filed on Jan. 3, 2022, now Pat. No. 11,920,915.

(60) Provisional application No. 63/479,149, filed on Jan. 9, 2023, provisional application No. 63/171,918, filed on Apr. 7, 2021.

(51) Int. Cl.
| | |
|---|---|
| *G01B 11/14* | (2006.01) |
| *B23B 35/00* | (2006.01) |
| *B23P 19/04* | (2006.01) |
| *B25J 11/00* | (2006.01) |
| *G01B 11/24* | (2006.01) |

(52) U.S. Cl.
CPC .............. *G01B 11/14* (2013.01); *B23B 35/00* (2013.01); *B23P 19/04* (2013.01); *B25J 11/0055* (2013.01); *G01B 11/2441* (2013.01); *B25J 11/005* (2013.01)

(58) Field of Classification Search
CPC ....... B23P 19/04; B23B 35/00; B25J 11/0055; B25J 5/02; B25J 9/023; B25J 11/005; G01B 11/14; G01B 11/2441; G01B 11/24
See application file for complete search history.

(56) References Cited

U.S. PATENT DOCUMENTS

| | | | |
|---|---|---|---|
| 4,837,615 A | 6/1989 | Boshier | |
| 7,016,052 B2 | 3/2006 | Bloch et al. | |
| 7,216,408 B2 | 5/2007 | Boyl-Davis et al. | |
| 7,380,776 B2 | 6/2008 | Boyl-Davis et al. | |
| 8,336,222 B1 | 12/2012 | Kostenick, Jr. et al. | |
| 9,776,330 B2 | 10/2017 | Day et al. | |
| 2002/0109847 A1 | 8/2002 | Drabarek | |
| 2004/0181148 A1 | 9/2004 | Uchiyama et al. | |
| 2005/0265798 A1* | 12/2005 | Boyl-Davis .......... | B23Q 9/0014 408/76 |

(Continued)

FOREIGN PATENT DOCUMENTS

ES     2575383 T3   6/2016

OTHER PUBLICATIONS

Angle-resolved low-coherence interferometry; Wikipedia; Feb. 1, 2021.

(Continued)

*Primary Examiner* — Michael P LaPage
(74) *Attorney, Agent, or Firm* — Yee & Associates, P.C.

(57) ABSTRACT

Systems and methods are provided for inspection. One embodiment is a method for automatically measuring a hole. The method includes driving a fiber optic probe into the hole, determining a profile by scanning the hole via the fiber optic probe, and determining whether an interface gap exists at the hole based on the profile.

15 Claims, 31 Drawing Sheets

(56) References Cited

U.S. PATENT DOCUMENTS

| | | | |
|---|---|---|---|
| 2007/0038052 A1 | 2/2007 | Swoyer et al. | |
| 2007/0153296 A1 | 7/2007 | Schick | |
| 2009/0213387 A1 | 8/2009 | Nakabayashi et al. | |
| 2011/0023888 A1 | 2/2011 | Vazales et al. | |
| 2012/0078121 A1 | 3/2012 | Ryan et al. | |
| 2018/0290393 A1* | 10/2018 | Bloch | B32B 37/06 |
| 2019/0186902 A1 | 6/2019 | Kato et al. | |
| 2020/0171599 A1 | 6/2020 | Lessmueller et al. | |
| 2020/0378749 A1 | 12/2020 | Ono et al. | |
| 2022/0326004 A1 | 10/2022 | Sisco et al. | |
| 2024/0261909 A1* | 8/2024 | Akey | H05K 7/20336 |

OTHER PUBLICATIONS

Boreinspect system; www.novacam.com/products/boreinspect-for-3d-bore-metrology/#overview; Apr. 7, 2021.

European Search Report; Application EP22160433; Jul. 29, 2022.

Multiple scatering low coherence interferonetry; Wikipedia; Feb. 1, 2021.

Optical 3D Profilometer; Profiilometers for High-Precision Non-Contact 3D Metrology; Novacam. www.novacam.com/products! Jan. 26, 2021.

Thompson et al., "Flex Track for use in Production," SAE Technical Paper 2005-01-3318, 2005, SAE International, Oct. 3, 2005, 7 pages.https://doi.org/10.4271/2005-01-3318.

Office Action dated Aug. 3, 2023 regarding U.S. Appl. No. 17/567,674, 11 pages.

Notice of Allowance dated Nov. 7, 2023, regarding U.S. Appl. No. 17/567,674, 10 pages.

* cited by examiner

*FIG. 14*

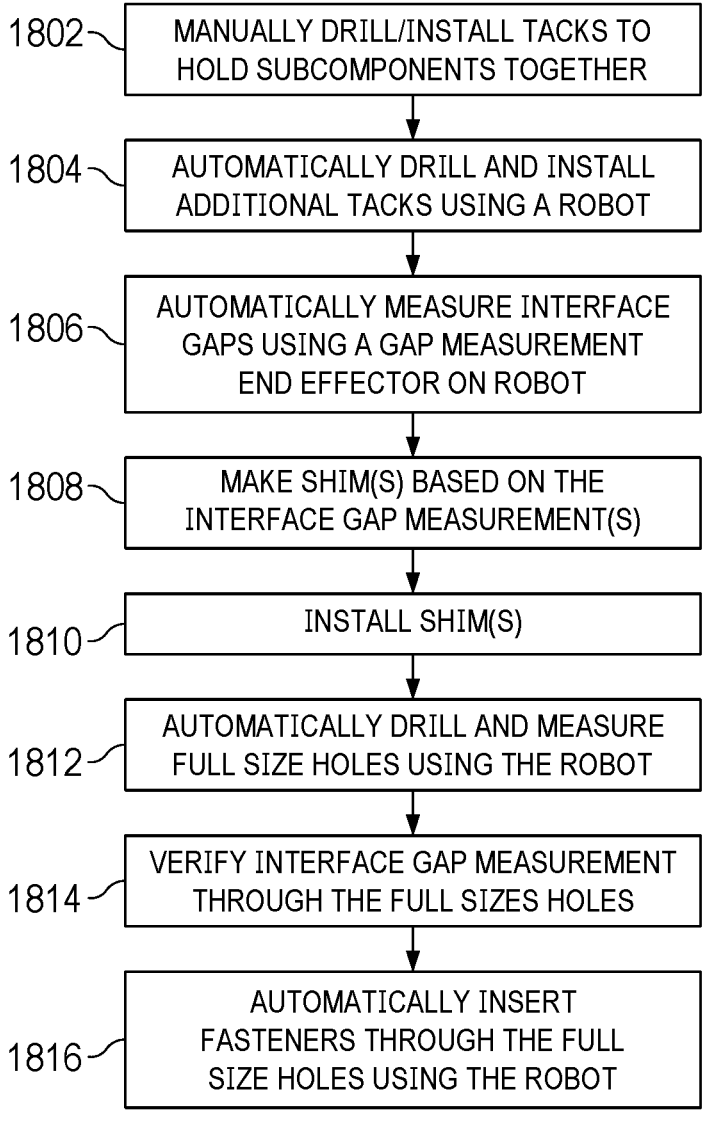

1802 — MANUALLY DRILL/INSTALL TACKS TO HOLD SUBCOMPONENTS TOGETHER

1804 — AUTOMATICALLY DRILL AND INSTALL ADDITIONAL TACKS USING A ROBOT

1806 — AUTOMATICALLY MEASURE INTERFACE GAPS USING A GAP MEASUREMENT END EFFECTOR ON ROBOT

1808 — MAKE SHIM(S) BASED ON THE INTERFACE GAP MEASUREMENT(S)

1810 — INSTALL SHIM(S)

1812 — AUTOMATICALLY DRILL AND MEASURE FULL SIZE HOLES USING THE ROBOT

1814 — VERIFY INTERFACE GAP MEASUREMENT THROUGH THE FULL SIZES HOLES

1816 — AUTOMATICALLY INSERT FASTENERS THROUGH THE FULL SIZE HOLES USING THE ROBOT

*FIG. 18A*

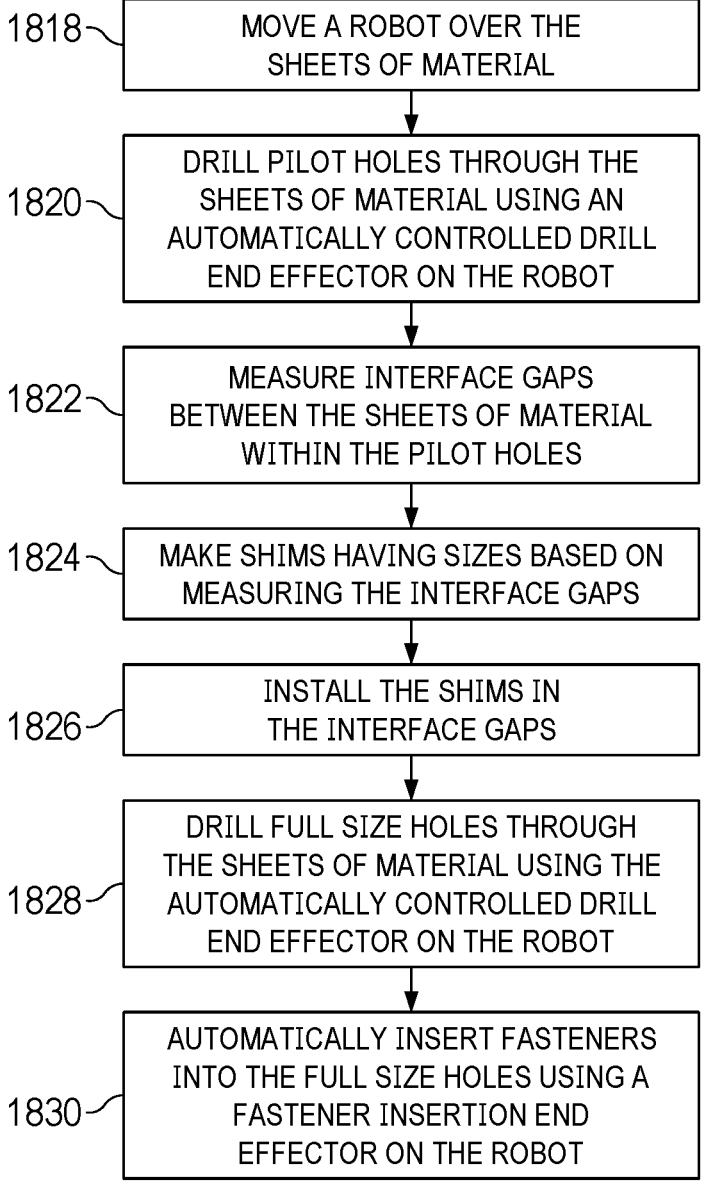

1818 — MOVE A ROBOT OVER THE SHEETS OF MATERIAL

1820 — DRILL PILOT HOLES THROUGH THE SHEETS OF MATERIAL USING AN AUTOMATICALLY CONTROLLED DRILL END EFFECTOR ON THE ROBOT

1822 — MEASURE INTERFACE GAPS BETWEEN THE SHEETS OF MATERIAL WITHIN THE PILOT HOLES

1824 — MAKE SHIMS HAVING SIZES BASED ON MEASURING THE INTERFACE GAPS

1826 — INSTALL THE SHIMS IN THE INTERFACE GAPS

1828 — DRILL FULL SIZE HOLES THROUGH THE SHEETS OF MATERIAL USING THE AUTOMATICALLY CONTROLLED DRILL END EFFECTOR ON THE ROBOT

1830 — AUTOMATICALLY INSERT FASTENERS INTO THE FULL SIZE HOLES USING A FASTENER INSERTION END EFFECTOR ON THE ROBOT

*FIG. 18B*

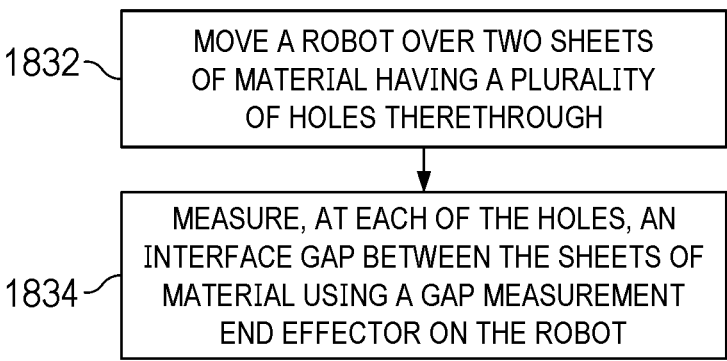

1832 — MOVE A ROBOT OVER TWO SHEETS OF MATERIAL HAVING A PLURALITY OF HOLES THERETHROUGH

1834 — MEASURE, AT EACH OF THE HOLES, AN INTERFACE GAP BETWEEN THE SHEETS OF MATERIAL USING A GAP MEASUREMENT END EFFECTOR ON THE ROBOT

FIG. 18C

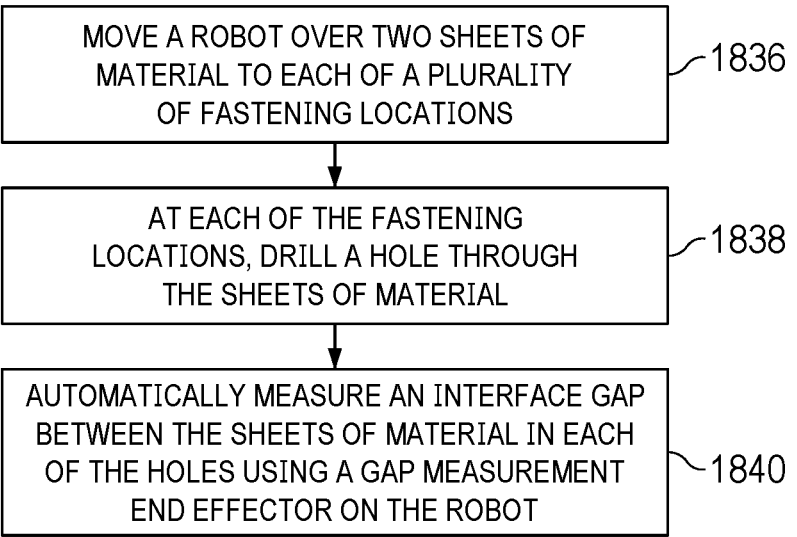

MOVE A ROBOT OVER TWO SHEETS OF MATERIAL TO EACH OF A PLURALITY OF FASTENING LOCATIONS — 1836

AT EACH OF THE FASTENING LOCATIONS, DRILL A HOLE THROUGH THE SHEETS OF MATERIAL — 1838

AUTOMATICALLY MEASURE AN INTERFACE GAP BETWEEN THE SHEETS OF MATERIAL IN EACH OF THE HOLES USING A GAP MEASUREMENT END EFFECTOR ON THE ROBOT — 1840

3102   SPECIFICATION AND DESIGN

3104   MATERIAL PROCUREMENT

3106   COMPONENT AND SUBASSEMBLY MANUFACTURING

3108   SYSTEM INTEGRATION

3110   CERTIFICATION AND DELIVERY

3112   IN SERVICE

3114   MAINTENANCE AND SERVICE

3200

AIRCRAFT

3202   AIRFRAME     INTERIOR   3204

SYSTEMS

PROPULSION     ELECTRICAL 3208   3210     3212   3214

HYDRAULIC     ENVIRONMENTAL    3206

NON-CONTACT AUTOMATED MEASUREMENT FOR INTERFACE GAPS

RELATED APPLICATIONS

This non-provisional patent application claims priority to U.S. Provisional Patent Application No. 63/171,918 filed on Apr. 7, 2021, and U.S. Provisional Patent Application No. 63/479,149 filed on Jan. 9, 2023, and is a continuation-in-part of U.S. Non-provisional patent application Ser. No. 17/567,674 filed Jan. 3, 2022, the entireties of which are incorporated by reference as if fully provided herein.

TECHNICAL FIELD

This disclosure generally relates to the fabrication and assembly of parts, and deals more particularly with inspection, measurement and analysis of the parts during their fabrication and assembly.

BACKGROUND

Parts fabricated from a stackup of material, such as composite materials or metal, that are affixed together (e.g., via fasteners, epoxy, co-curing, or co-bonding) sometimes exhibit gaps in their interface regions. These gaps may be particularly small, such as on the order of thousandths of an inch. However, even small gaps may be out of tolerance, depending on the intended use of the resulting part. For example, aerospace parts can have particularly tight tolerances and sometimes require the use of shims to fill gaps.

Determining the size of a gap within an interface region can be challenging and time-consuming. In many instances, gaps are measured at each of multiple holes (e.g., fastener holes) that are drilled through an interface region prior to installing fasteners in the holes. Visual inspection of one or more gaps at each hole is therefore particularly time and manpower consuming in many circumstances, and there may be little physical clearance for viewing the gap. Current gap measurement techniques involve iteratively inserting "feeler" gauges into a gap, until an appropriate shim size is found that will fill gap. While effective, this process can be time consuming and dependent on the skill of the technician, especially for parts such as barrel section joints of an aircraft fuselage containing hundreds or thousands of holes requiring gap measurement.

It would therefore be desirable to provide a method and system that take into account at least some of the issues discussed above, as well as other possible issues.

SUMMARY

Embodiments described herein provide automated systems and methods for utilizing insertable probes that perform interferometry in order to determine the sizes of gaps between sheets of material ("interface gaps") within holes in a part. These techniques enable interface gap measurement to be performed reliably and automatically, and in a substantially shorter time period than prior manual measurement systems. Moreover, automatic interface gap measurement can be performed and synchronized with automated hole drilling and measurement, and insertion of fasteners. Furthermore, interface gap measurement between sheets of material that are curved, such as fuselage sections of an aircraft can be automatically performed. Automation of the interface gap measurement process in combination with automated hole drilling/measurement and fastener insertion may substantially increase production efficiency.

According to one aspect, a method is provided of measuring an interface gap between sheets of material having a plurality of holes therethrough. The method comprises moving a robot over the sheets to each of the holes, and at each of the holes, measuring the interface gap between the sheets of material using a gap measurement end effector on the robot.

According to another aspect, a method is provided of joining two sheets of material together. The method includes moving a robot over the sheets of material to each of a plurality of fastening locations. At each of fastening location, the method includes drilling a hole through the sheets of material, and automatically measuring an interface gap between the sheets of material at each of the holes using a gap measurement end effector on the robot.

According to a further aspect, a method is provided of joining two curved sheets of material together. The method includes moving a robot over the sheets of material, and drilling pilot holes through the sheets of material using an automatically controlled drill end effector on the robot. The method further includes measuring interface gaps between the sheets of material within the pilot holes, and making shims having sizes based on the measured interface gaps. The method further includes installing the shims in the interface gaps, and drilling full-size holes through the sheets of material using an automatically controlled drill end effector on the robot. The method also includes automatically inserting fasteners in the full-size holes using a fastener insertion end effector on the robot.

According to still another aspect, a system is provided for fastening two sheets of material together. The system comprises an automatically controlled robot, and a drill end effector on the robot configured to automatically drill holes through the sheets of material. The system also includes a gap measurement end effector on the robot configured to automatically measure an interface gap between the sheets of material within the holes.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 14 is a functional diagram depicting internal components of a hole measurement system in an illustrative embodiment.

FIG. 18A is a flow diagram of a method of attaching sheets of material together using the automated gap measurements.

FIG. 18B is a flow diagram of a method of attaching sheets of material together using end effectors on a robot.

FIG. 18C is a flow diagram of a method of measuring an interface gap between sheets of material having a plurality of holes therethrough.

FIG. 18D is a flow diagram of a method of joining two sheets of material together.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Various components described herein may be fabricated from composite parts and/or metallic parts. Composite parts, such as Carbon Fiber Reinforced Polymer (CFRP) parts, are initially laid-up in multiple layers that together are referred to as a preform. Individual fibers within each layer of the preform may be aligned parallel with each other, but different layers exhibit different fiber orientations in order to increase the strength of the resulting composite part along different dimensions. Furthermore, some layers may comprise woven fabric made from fibers. The preform includes a viscous resin that solidifies in order to harden the preform into a composite part (e.g., for use in an aircraft). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
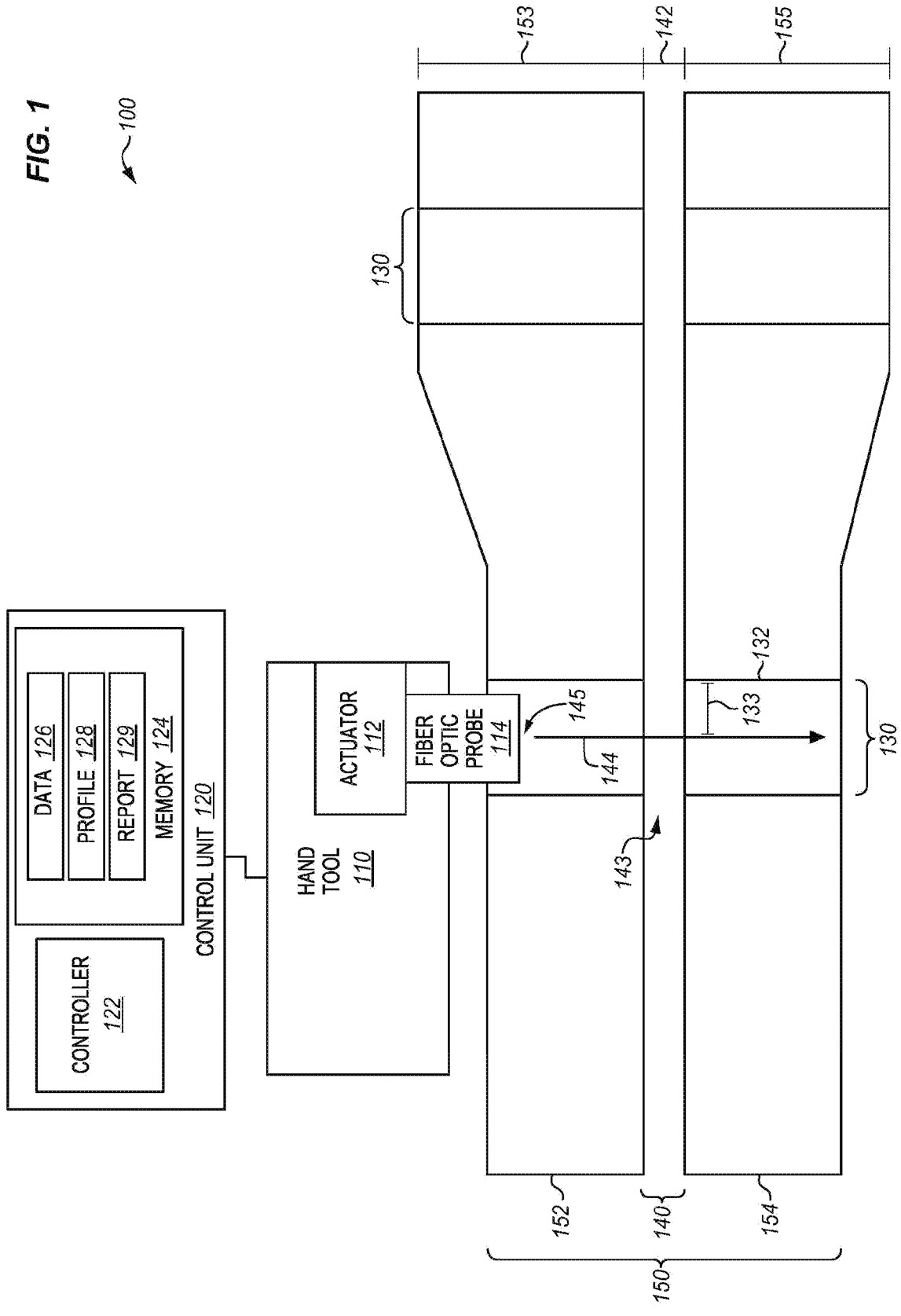
FIG. 1 illustrate a hole measurement system in an illustrative embodiment.

FIG. 1 illustrates a hole measurement system 100 in an illustrative embodiment. Hole measurement system 100 comprises any system, device, or component operable to inspect a hole 130 at a part 150 for one or more interface gaps 140. Depending on the part 150, there may be no interface gaps 140, or an arbitrary number of interface gaps 140. Furthermore, each interface gap 140 may be uniform in thickness or tapered within the purview of particular ones of hole 130. Each hole 130 may therefore have a different one of an interface gap 140 to measure.

Figure 15:
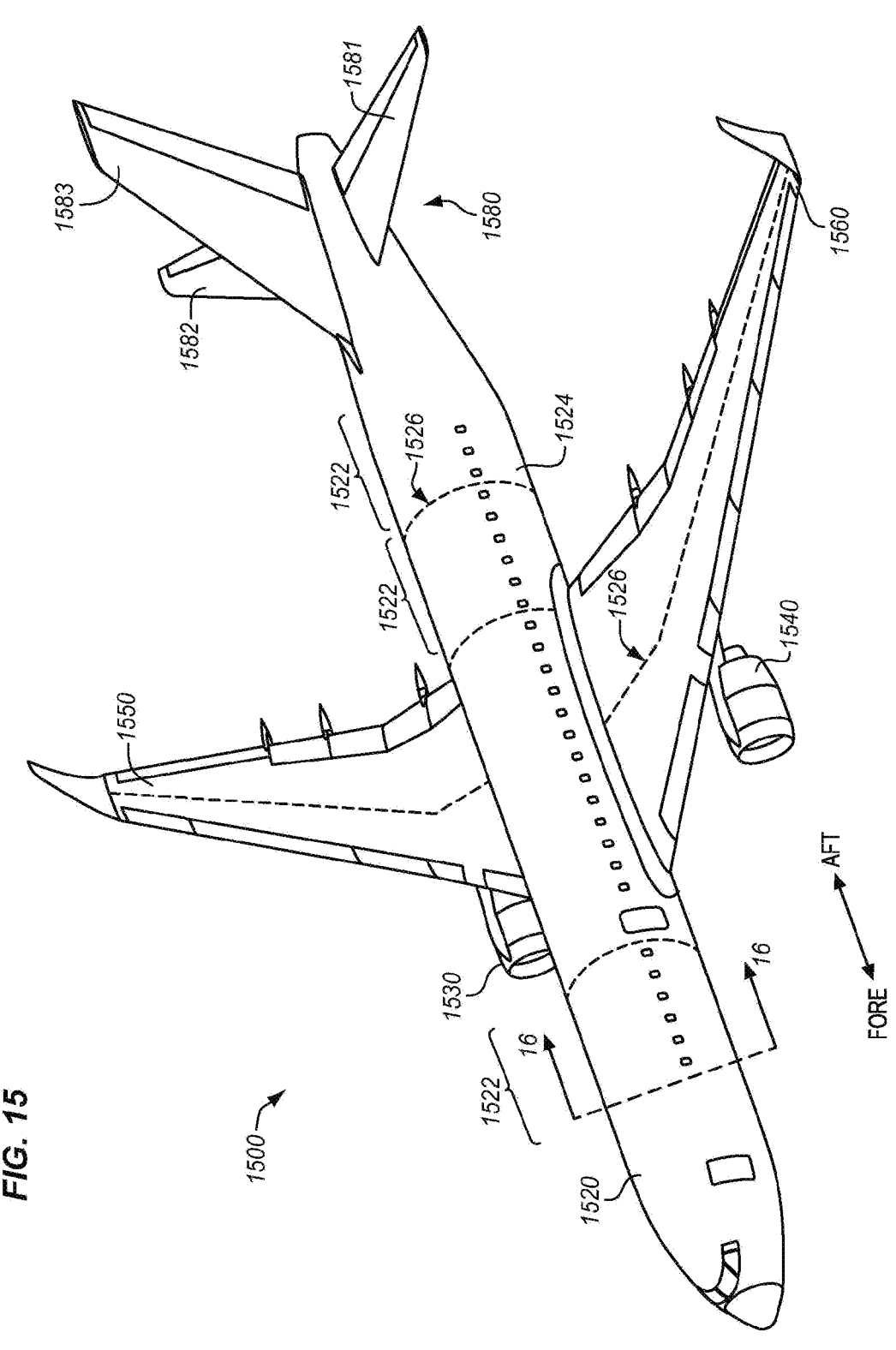
FIG. 15 depicts an aircraft in an illustrative embodiment.

As used herein, an interface gap 140 comprises any empty space at an interface 143 between one or more sheets 152 and 154. Sheets 152 and 154 may comprise metallic and/or composite materials. In one embodiment, the sheets 152 and/or 154 have varying thicknesses between holes 130 within the part 150. For example, the sheets 152 and/or 154 may have varying thicknesses 153 and 155 between holes 130 longitudinally such as at a part 150 for a barrel section 1522 (FIG. 15). In further embodiments fasteners (not shown) inserted into the hole 130 could also be used to splice upper half barrel sections (not shown) to lower half barrel sections (not shown). In such a process, three materials are joined, such as an upper half barrel section (not shown), a lower half barrel section (not shown), and a splice plate (not shown). In such an instance, a butt splice would be formed where only the splice plate joins the upper half barrel section to the lower half barrel section. Thus, the sections are sandwiched, and the splice plate forms a common joining element.

In this embodiment, hole measurement system 100 includes a hand tool 110 configured for operation by a technician. The hand tool 110 includes a fiber optic probe 114 that is configured to scan walls of a hole 130 using Low-Coherence Interferometry (LCI), and an actuator 112 that is configured to adjust a one of depthwise positions 145

(i.e., a position along depth 144 of the hole 130) for the fiber optic probe 114. Distances 133 (e.g., to a wall 132 of the hole 130) are measured for each of multiple ones of depthwise positions 145. When a one of depthwise positions 145 of the interface gap 140 is reached, the distance 133 will measurably deviate from prior ones of distances 133 acquired at depthwise positions 145 for the wall 132. Thus, in one embodiment, if the distances 133 exceed expected values, the presence of an interface gap 140 is inferred.

A controller 122 is coupled with the hand tool 110. The controller 122 receives a data 126 from the fiber optic probe 114 for storage in memory 124. Memory 124 is configured to store a data 126 from the fiber optic probe 114. The data 126 may be utilized to generate a profile 128 of the hole 130. That is, in one embodiment the controller 122 is configured to determine a profile 128 of the hole 130 based on the data 126. Controller 122 identifies the presence of any interface gap 140 based on the profile 128, and generates a report 129 indicating a dimension 142 of the interface gap 140.

In one embodiment, the report 129 is based on distances 133 reported in the profile 128, and indicates the existence of, and characterizes, any interface gaps 140 discovered within the hole 130, should the interface gaps 140 exist. In one embodiment, controller 122 is implemented as custom circuitry, as a hardware processor executing programmed instructions stored in memory, or some combination thereof.

Illustrative details of the operation of hole measurement system 100 will be discussed with regard to FIG. 2. Assume, for this embodiment, that hand tool 110 has been placed at a hole 130 in preparation for measuring that hole 130.

Figure 2:
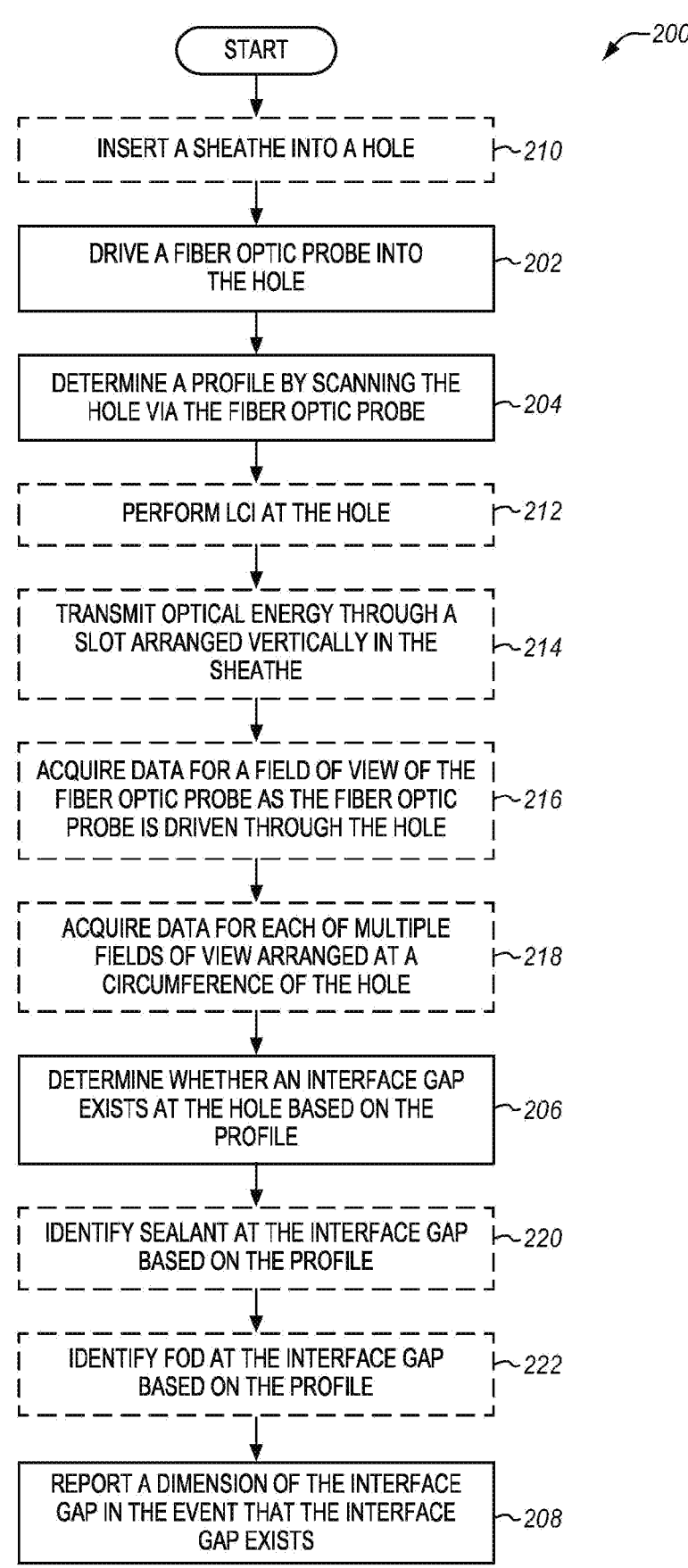
FIG. 2 is a flowchart illustrating a method for operating a hole measurement system in an illustrative embodiment.

FIG. 2 is a flowchart illustrating a method 200 for operating a hole measurement system in an illustrative embodiment. The steps of method 200 are described with reference to a hole measurement system 100 of FIG. 1, but those skilled in the art will appreciate that method 200 may be performed in other systems. The steps of the flowcharts described herein are not all inclusive and may include other steps not shown. The steps described herein may also be performed in an alternative order. Furthermore, the steps which are indicated with dashed lines are particularly optional.

Method 200 includes optionally inserting 210 a sheathe 470 (FIG. 4) into a hole 130. Method 200 further includes driving 202 a fiber optic probe 114 into the hole 130. Driving the fiber optic probe 114 refers to adjusting a one of depthwise positions 145 of the fiber optic probe 114 with respect to the hole 130. Thus, this operation may comprise increasing or decreasing a one of depthwise positions 145 of the fiber optic probe 114 within the hole 130, or even extending the fiber optic probe 114 through the hole 130. In one embodiment, driving of the fiber optic probe 114 is performed without the fiber optic probe 114 contacting or approaching a wall 132 of the hole 130. This beneficially protects the fiber optic probe 114 from being smeared by sealant, and/or from damage by contacting the walls 132 of the hole 130.

Method 200 further includes, at 204 determining a profile 128 by scanning walls of the hole 130 via the fiber optic probe 114. At 214, scanning the hole 130 may be performed by transmitting optical energy 854 (FIG. 8) in order to optionally perform 212 Low-Coherence Interferometry (LCI) at the hole 130, or to perform other operations (e.g., Light Detection and Ranging (LIDAR)) to determine distances 133 to a wall 132 of the hole 130. As used herein, a "profile" refers to a series of measurements that describe distances 133 at depthwise positions 145 within the hole 130. Thus, a profile 128 may comprise a single set of measurements associated with different one of depthwise positions 145, may comprise an array of measurements, wherein groups of measurements correspond with different ones of depthwise positions 145, etc.

In further embodiments, method 200 also includes optionally acquiring 216 a data 126 for a field of view 1132 (FIG. 11B) of the fiber optic probe 114 as the fiber optic probe 114 is driven through the hole 130. The method 200 may further include optionally acquiring 218 data 126 for each of fields of view 1132, 1134, and 1136 (FIG. 11B) arranged at a circumference 1140 (FIG. 11B) of the hole 130.

Method 200 further includes at 206 determining whether an interface gap 140 exists at the hole 130 based on the profile 128. Determining at 206 the interface gap 140 based on the profile 128 may be performed by comparing expected measurements in the profile 128 to actual measurements in the profile 128. For example, if a profile 128 is expected to measure a set of distances 133 of one quarter inch, within a predefined tolerance, any distance 133 beyond that tolerance may be considered a portion of an interface gap 140. In a further embodiment, any distance 133 more than twice an expected amount, or any distance 133 greater than a threshold distance, is indicative of the presence of an interface gap 140 at a one of depthwise positions 145. Subsequent to identifying the one of depthwise positions 145 at which the interface gap 140 is present, controller 122 determines contiguous ones of depthwise positions 145 for which an interface gap 140 has been detected, enabling the rapid detection of a plurality of interface gaps 140 even within a hole 130. This information is utilized in one embodiment to determine a dimension 142 of the interface gap 140 with respect to the depth 144 of the hole 130. Thus, in this embodiment, the dimension 142 is measured along the depth 144 of the hole 130. Depending on the hole 130 being inspected, no interface gap 140 may exist. In such circumstances, controller 122 proceeds to forego the procedures at 206.

In further embodiments, method 200 includes optionally identifying 220 sealant 1110 at or in the interface gap 140 based on a region 1344 (FIG. 13) of the profile 128 that represents the interface gap 140, and/or optionally identifying 222 FOD 1120 at the interface gap 140 based on the profile 128.

Furthermore, method 200 includes reporting 208 a dimension 142 of the interface gap 140, in the event that the interface gap 140 exists. Reporting the dimension 142 of the interface gap 140 may comprise updating a display 1403 (FIG. 14) at the hole measurement system 100, generating an electronic message for transmission to an operator of the hand tool 110, or performing other functions.

Method 200 provides a technical benefit by substantially reducing the amount of labor and time involved in determining the dimension 142 of an interface gap 140 at a hole 130. By automatically detecting and measuring the dimensions 142 of any interface gaps 140 at a hole, the technician no longer needs to manually insert shims for the purpose of measuring the hole 130 before filling the hole 130 by installing a fastener (not shown).

With a discussion of the operations and components of an illustrative version of a hole measurement system 100 provided above, further FIGS. 3-10 depict various components of a further implementation of a hole measurement system 100. In this embodiment, a hand tool 110 comprises a body 316 having a case 315. The hand tool 110 also includes a barrel 310. The hand tool 110 is coupled via umbilicals 312 and 314 with a control unit 120 in the form of a cart 320 that detects an interface gap 140 at the walls 132 of the hole 130 based on data 126 from the fiber optic probe 114. Thus, in this embodiment, the control unit 120 comprises a cart 320 that is coupled for communication with the hand tool 110 via an umbilical 314. In further embodiments, umbilicals 312 and/or 314 are foregone in place of pressure systems, power systems, and/or communication systems (not shown) that are internalized at the hand tool 110. For example, wireless communication technologies, such as protocols for wireless networking or Bluetooth communications, may be implemented to facilitate communications between the hand tool 110 and the control unit 120.

Coupling a hand tool 110 to a cart 320 via umbilicals 312 and 314 beneficially reduces the bulk of the hand tool 110, by enabling a server 1402 (FIG. 14), pressure system (e.g., compressed air line 1420 of FIG. 14), electrical power supply (e.g., power line 1410), and/or other components to be integrated into the cart 320.

Figure 3:
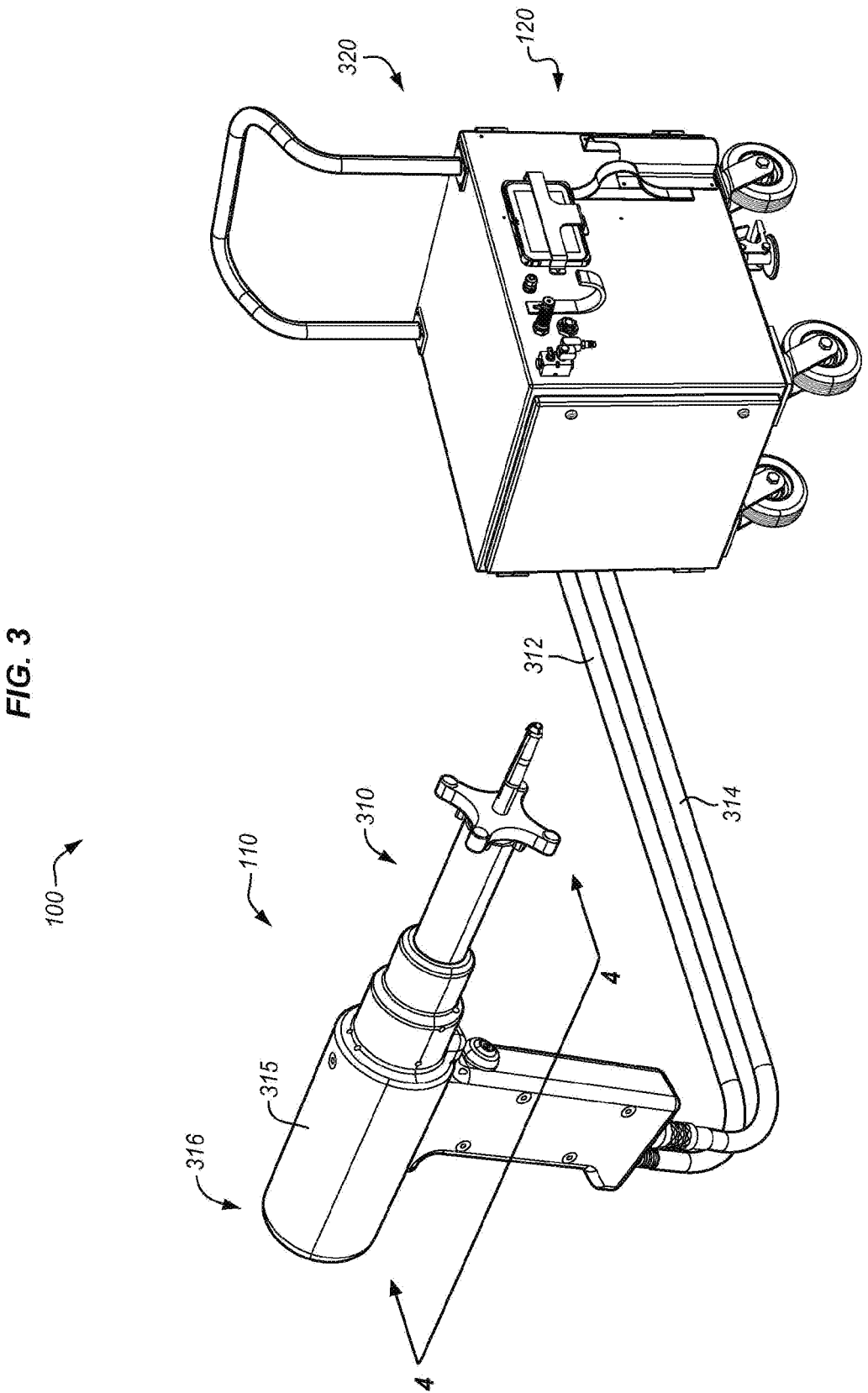
FIG. 3 depicts a further hole measurement system in an illustrative embodiment.
Figure 4:
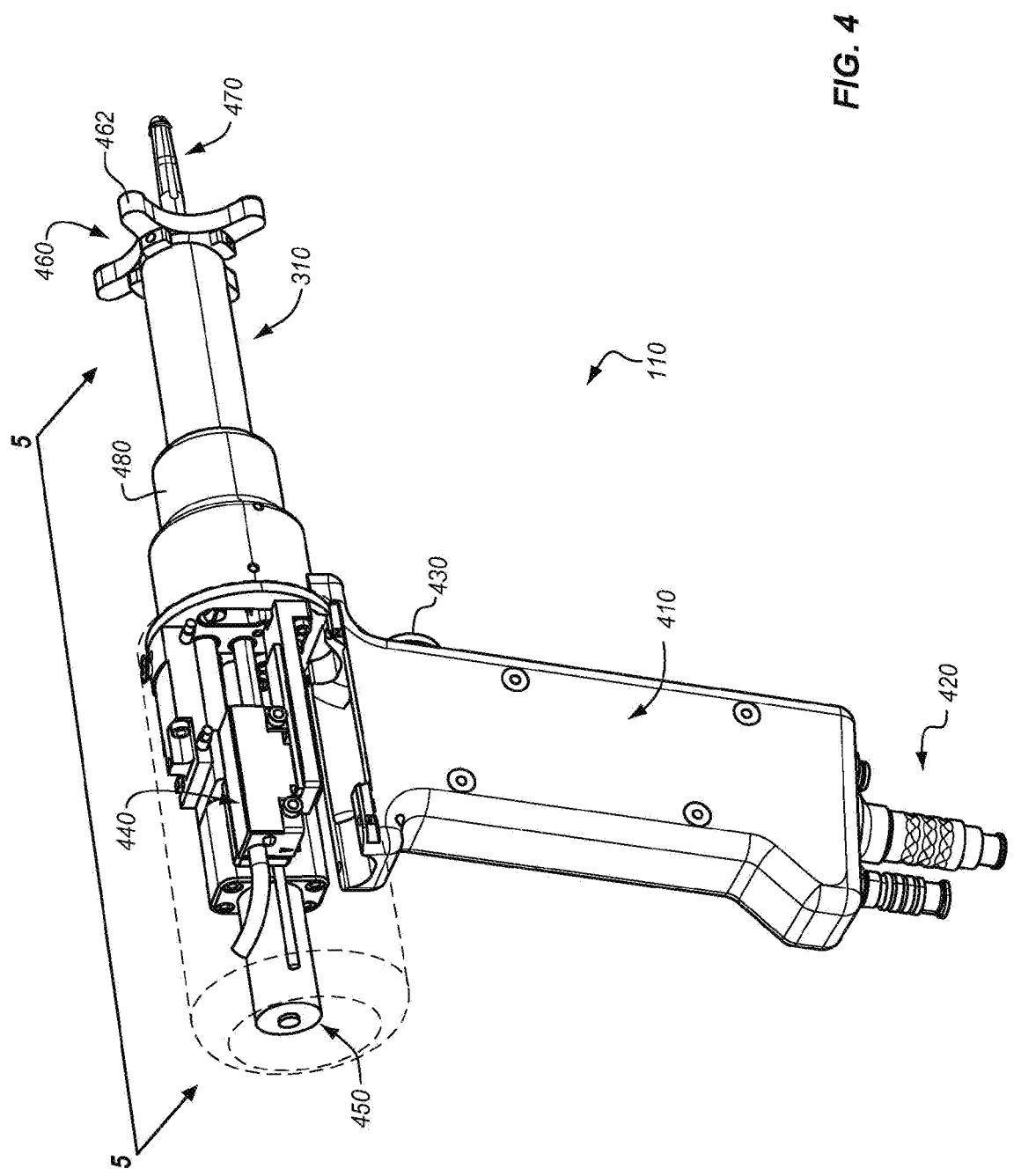
FIGS. 4-7 depict internal views of a hand tool of a hole measurement system in an illustrative embodiment.

FIG. 4 is an internal side view of hand tool 110, wherein case 315 has been removed. FIG. 4 corresponds with view arrows 4 of FIG. 3. In this view, handle 410 is visible, as is trigger 430 at the handle 410. Ports 420 for connecting to the umbilicals 312 and 314 of FIG. 3 are also depicted below the handle 410. An additional one of a case 480 (e.g., a housing) is also depicted.

Additional features of the hand tool 110 are visible in this view. Specifically, motor 450 is visible, as is scale 440. Motor 450 may comprise a linear actuator, worm drive, or other device configured to drive a fiber optic probe 114 at the hand tool 110 into a hole 130 at a part 150. Thus, the fiber optic probe 114 is effectively implemented as an end effector internal to the hand tool 110, that extends outward through the barrel 310. Scale 440 may comprise a magnetic tape scale or other measurement device that is configured to determine how far the fiber optic probe 114 has been extended or retracted by the motor 450.

The view of FIG. 4 further provides an enhanced level of detail depicting the barrel 310. Specifically, barrel 310 terminates at an endplate 460 having multiple feet 462. The feet 462 are dimensioned to be placed flush against a surface 816 (FIG. 8) of a part 150. The feet 462 are arranged to allow normal positioning of the hand tool 110 relative to the surface 816 through which the hole 130 is drilled. The feet 462 are also shaped to fit around the adjacent ones of holes 130 without interfering with holes 130 that are adjacent. A sheathe 470 is movable to extend beneath the endplate 460, and is dimensioned for insertion into a hole 130. Specifically, in one embodiment, sheathe 470 surrounds the fiber optic probe 114, and includes a slot 732 (of FIG. 7) that is arranged/proceeds axially relative to the barrel 310 and permits optical energy 854 (of FIG. 8) from the fiber optic probe 114 to reach a wall 132 of the hole 130. Depending on embodiment and a field of view 1132 (FIG. 11) of the fiber optic probe 114, the angle and/or size of the slot 732 may be adjusted to accommodate the field of view 1132. The optical energy 854 may then return to the fiber optic probe 114 and reach the control unit 120 (e.g., via a fiber optic line in an umbilical 312 and/or 314) for analysis.

Figure 5:
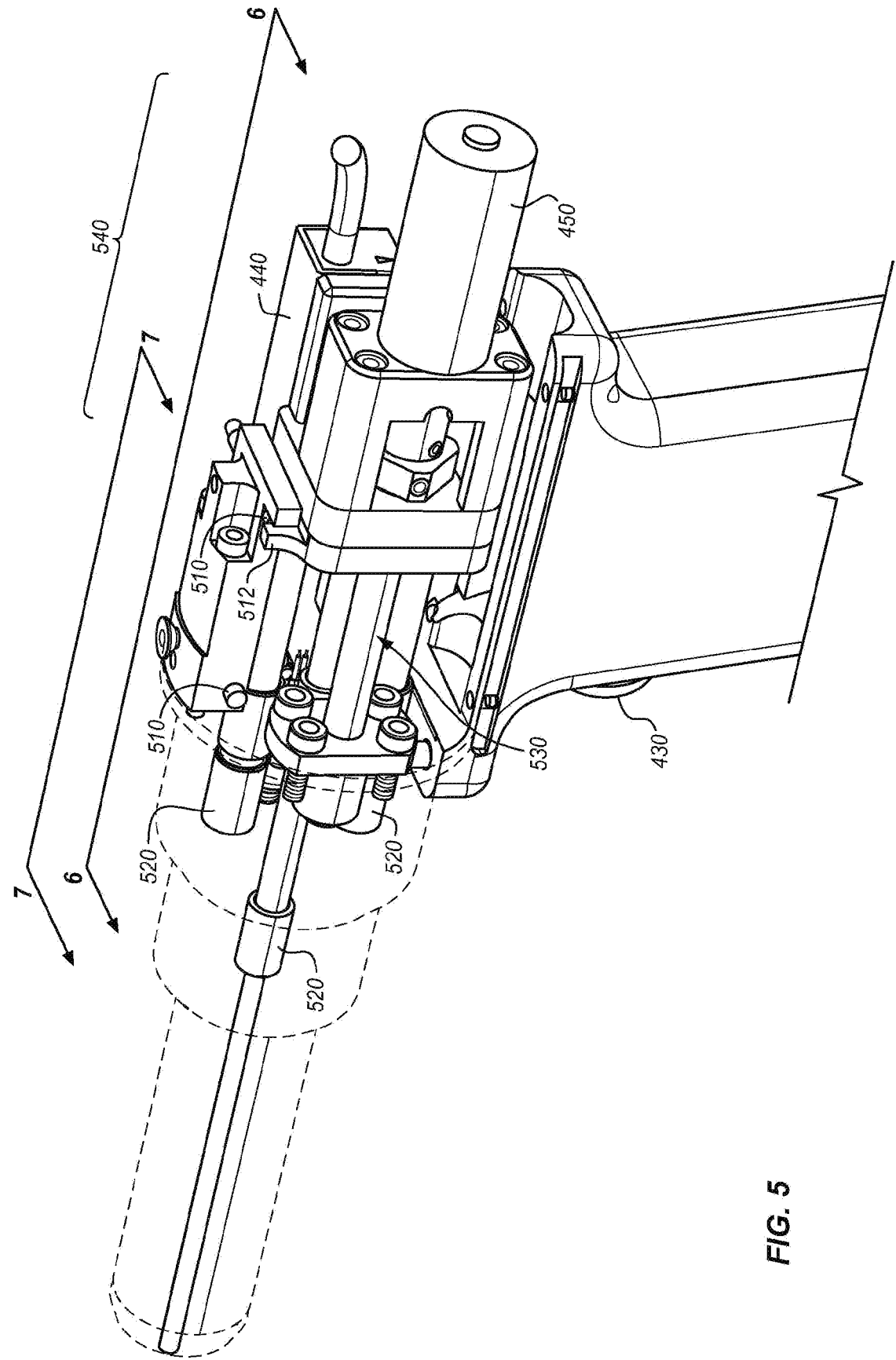

FIG. 5 is side view of internal structure at the hand tool 110, wherein case 480 (e.g., a housing) has been removed. FIG. 5 corresponds with view arrows 5 of FIG. 4. FIG. 5 illustrates an assembly 540 driven by motor 450 along ballscrew 530. The limits of motion of the assembly 540 are indicated by limit proximity switches 510, which detect the presence of prong 512 at the assembly 540 (e.g., via pressure, physical interaction, or other means), and provide signaling indicating whether the assembly 540 has reached a limit of extension or retraction. The assembly 540 is held in position during extension and retraction via guide bushings 520. Thus, in one embodiment, depth of insertion can be used to measure grip length for a hole 130.

Figure 6:
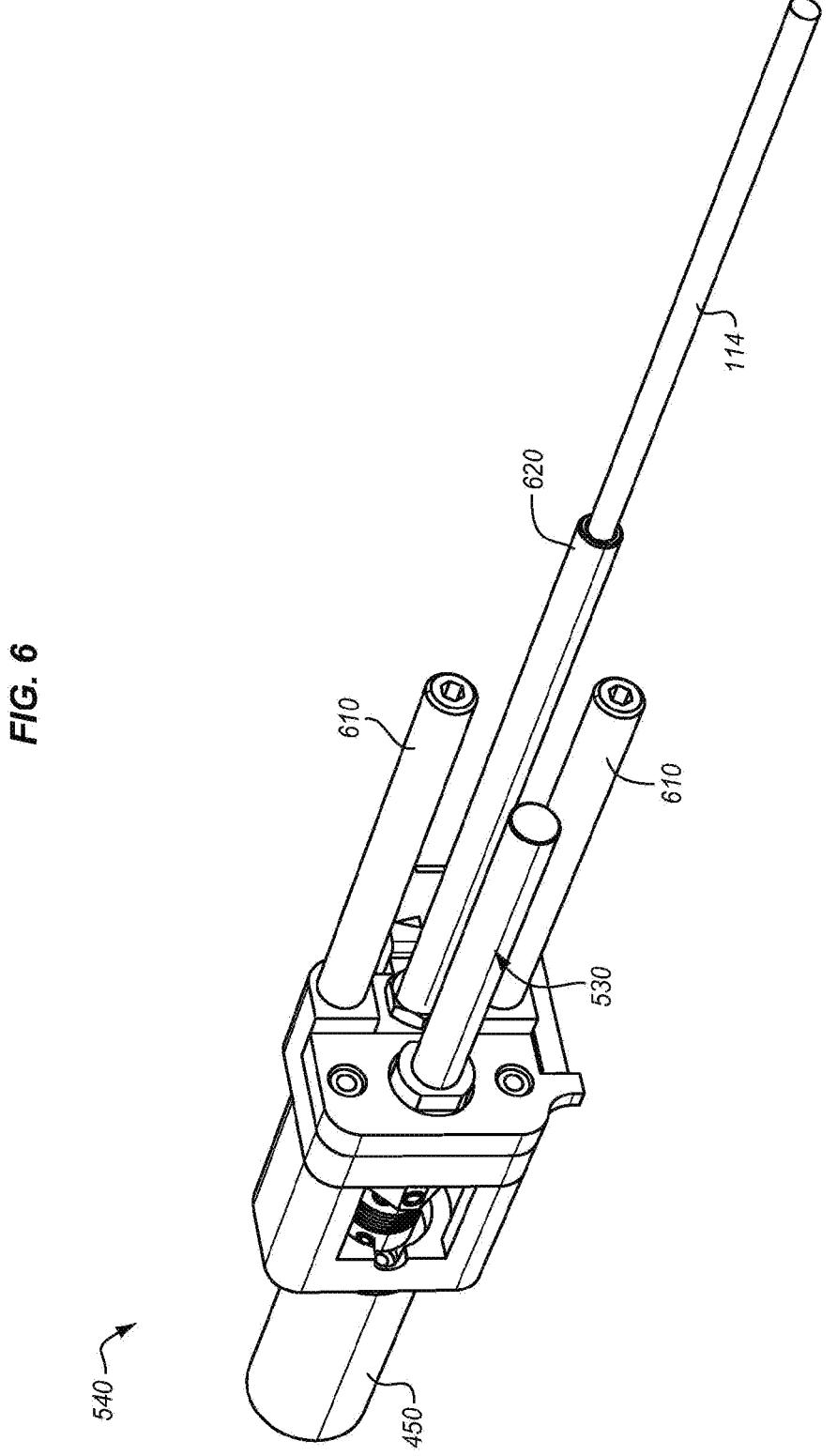

FIG. 6 is a view of assembly 540 as removed from hand tool 110. FIG. 6 corresponds with view arrows 6 of FIG. 5. Guide rods 610 interact with guide bushings 520 of FIG. 5 to prevent assembly 540 from rotating when extended or retracted. Guide rod 620 performs a similar function, and additionally houses a fiber optic probe 114 for detecting a distance 133 to a wall 132 of a hole 130.

Figure 7:
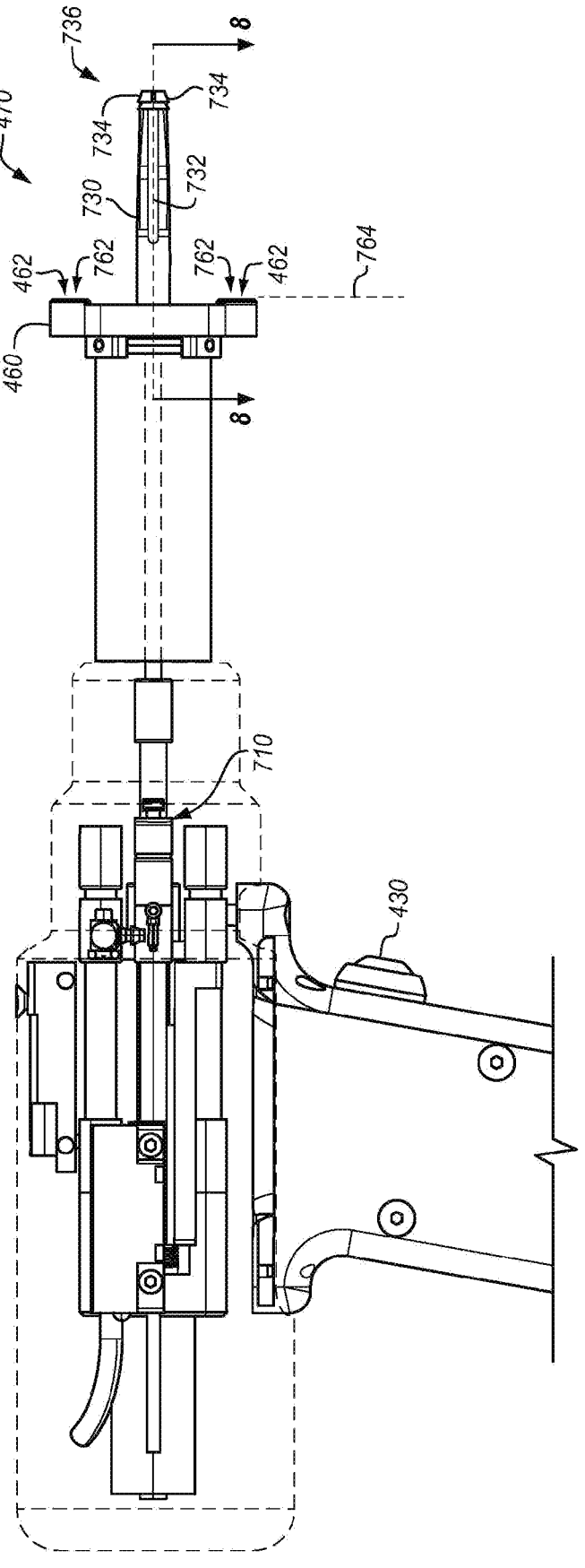

FIG. 7 is a further side view of internal structure of the hand tool 110. FIG. 7 corresponds with view arrows 7 of FIG. 5. In this view, endplate 460 and feet 462 are visible. Contact surfaces 762 of feet 462 are co-planar with plane 764 in this embodiment, but may be contoured in accordance with any suitable geometry in order to ensure that feet 462 are placed into contact with a surface 816 (FIG. 8) into which a hole 130 has been drilled. FIG. 7 also depicts a body 730 of the sheathe 470, which is configured for insertion into a hole 130. The sheathe 470 includes prongs 734 that are configured to grip a distal end 836 of the hole 130, for example, with a clamp-up force between five and ten pounds force, or more. For example, an automated system that foregoes a manual tool may potentially apply hundreds of pounds of force.

In this embodiment, the sheathe 470 includes slots 732, which permit optical energy 854 (FIG. 8) from a fiber optic probe 114 to be transmitted through the sheathe 470. The slots 732 further permit for a tip 736 of the sheathe 470 to be expanded and retracted in diameter in response to applied forces. That is, just like the slot of a clothespin, the fact that the slots 732 proceed all the way to the tip 736 enables the prongs 734 to separate and deflect from each other. This enables prongs 734 at the tip 736 to extend beyond a diameter 832 (FIG. 8) of a hole 130. The sheathe 470 is retractable relative to endplate 460. When sheathe 470 is retracted, its prongs 734 are wider than a diameter 832 (FIG. 8) of the hole 130. When sheathe 470 is extended, its prongs 734 are less wide than a diameter 832 (FIG. 8) of the hole 130. By extending sheathe 470, sheathe 470 may be inserted through a hole 130. By retracting sheathe 470, prongs 734 are dimensioned for gripping a distal end 836 (FIG. 8) of the hole 130. This enables gripping of the hole 130 during measurement of the hole 130, and further permits the use of hand tool 110 to grip and measure the holes 130 having a variety of depths. Still further, the gripping of the hole 130 also ensures that the feet 462 fully engage a surface 816 (FIG. 8) to make the hand tool 110 normal to the surface 816. This also ensures that the hand tool 110 does not move relative to the hole 130 while a scan is occurring. Still further, this feature allows the control unit 120 to measure a grip length of the hole 130, which is particularly useful in determining the size of a fastener (not shown) to install into the hole 130, and may also indicate whether an interface gap 140 of excessive size exists in the hole 130 (e.g., if a grip length is significantly greater than expected).

Still further, when prongs 734 grip the distal end 836 by clamping to surface 817, this enables a grip length 839 (FIG. 8) for each of the holes to be measured, by measuring between the prongs 734 and the contact surface 762 of the endplate 460. Grip length 839 may be important when deciding upon a fastener size (not shown) to install into the hole 130. FIG. 7 further depicts a solenoid valve 710, which may be selectively activated to permit the flow of pneumatic pressure 1422 (FIG. 14) into barrel 310.

Figure 8:
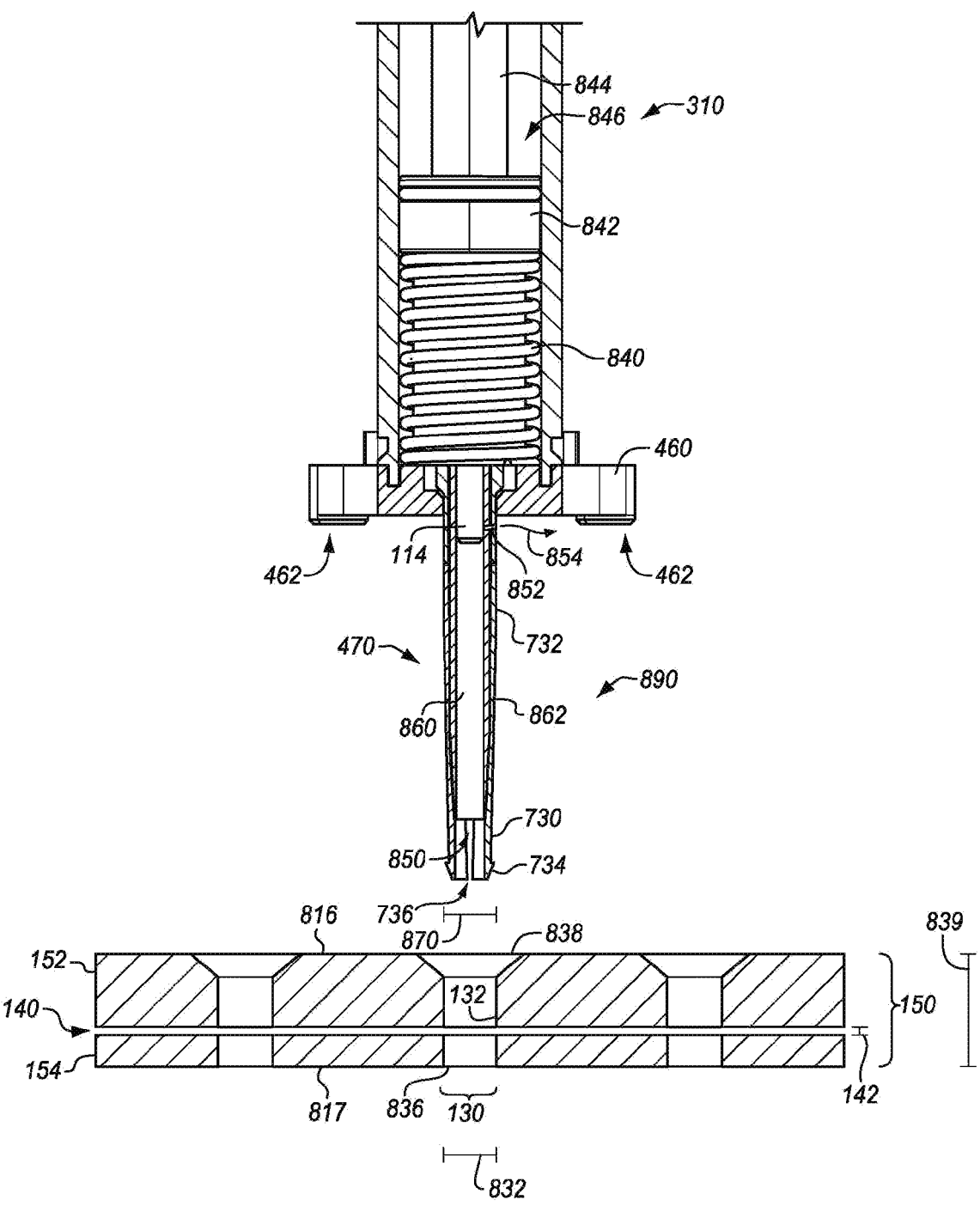
FIGS. 8-10 are section cut diagrams that depict a hand tool interacting with a hole in an illustrative embodiment.
Figure 10:
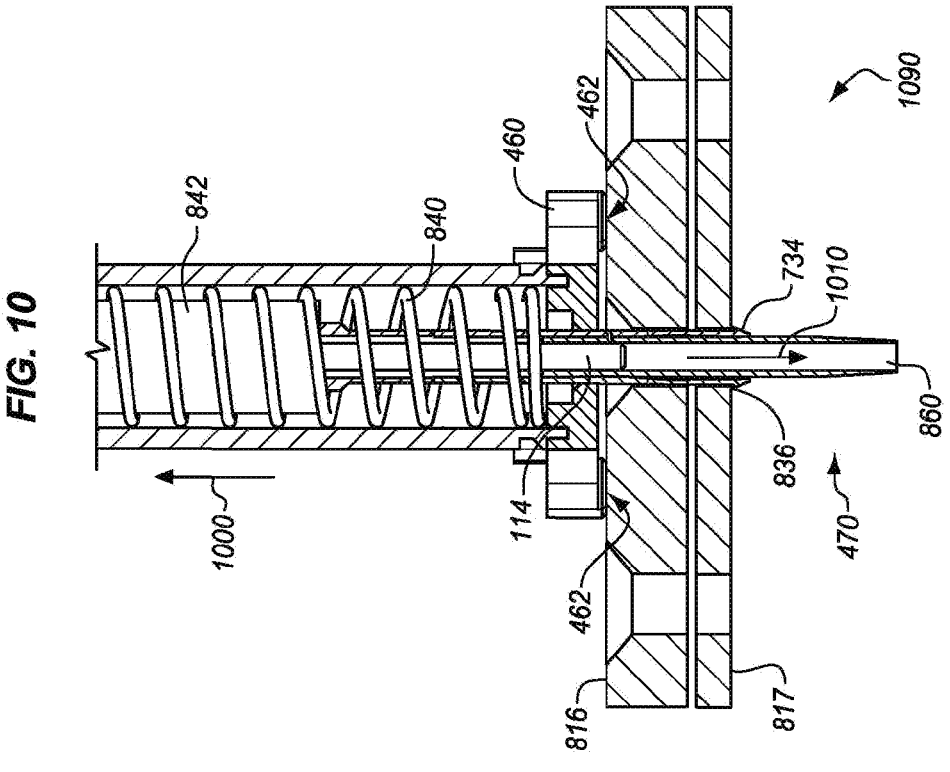
Figure 9:
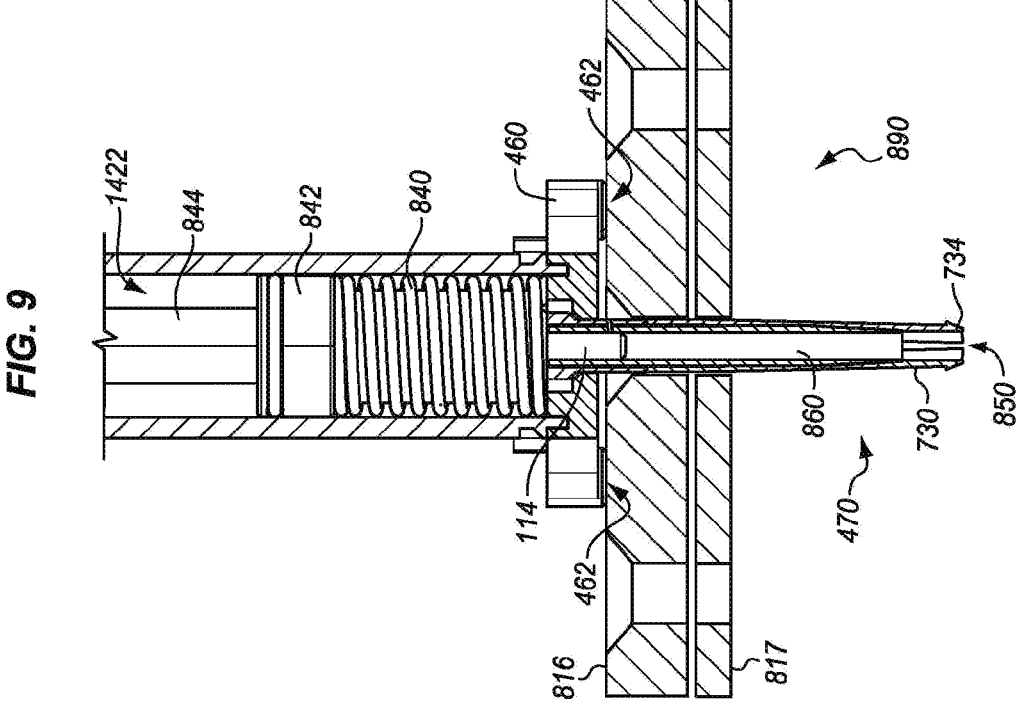

With a discussion of a hand tool 110 provided above, discussion of operation of the hand tool 110 during measurement of a hole 130 will be provided with regard to FIGS. 8-10. FIGS. 8-10 are section cut diagrams that depict a hand tool 110 interacting with a hole 130 in an illustrative embodiment, and correspond with view arrows 8 of FIG. 7. In FIG. 8, sheathe 470 is poised over a hole 130. The hole 130 is drilled through a surface 816 of part 150 comprising a sheet 152 and a sheet 154, which are affixed to each other, but separated by an interface gap 140. Hole 130 includes a proximate end 838 which receives the sheathe 470, and a distal end 836 through which the sheathe 470 exits the hole 130 and grips the distal end 836.

Sheathe 470 is coupled to piston 842, which circumscribes the rod 844 within an interior 846 of the barrel 310. Rod 844 is fixed in position within the barrel 310, and piston 842 is biased by a biasing element 840 (e.g., a spring) upwards, which holds sheathe 470 in a retracted position (e.g., retracted position 1090 of FIG. 10). Trigger 430 is configured to activate a piston 842 (of FIG. 8) that retracts the sheathe 470. Specifically, when trigger 430 is pulled, pneumatic pressure 1422 (FIG. 14) within an enclosed volume defined by the barrel 310 drives piston 842 downwards and compresses the biasing element 840, to place the sheathe 470 into an extended position 890. Thus, by pressing the trigger 430, sheathe 470 may be extended into the hole 130. After the trigger is released, the sheathe 470 is retracted by the biasing element 840 as the biasing element 840 returns to rest. This causes the sheathe 470 to grip the hole 130 via prongs 734.

Within an interior 850 of the sheathe 470 is a bushing 860. Bushing 860 is configured to increase a diameter 870 of the sheathe 470. When the sheathe 470 is extended as shown in FIG. 8, the bushing 860 does not elastically deform the tip 736 of the sheathe 470. Thus, a diameter 870 of the tip 736 remains less than a diameter 832 of the hole 130. This difference in diameters between hole 130 and sheathe 470 (i.e., while the sheathe 470 is tapered and before the tip 736 is elastically deformed by the bushing 860) permits insertion of sheathe 470 into the hole 130. Furthermore, the fact that the sheathe 470 is tapered along its length facilitates insertion of the sheathe 470 into the hole 130. When sheathe 470 is retracted, bushing 860 elastically deforms the sheathe 470, increasing diameter 870 to greater than diameter 832. This causes prongs 734 to grip the distal end 836 of the hole 130, securing the hand tool 110 in place.

FIG. 8 further depicts an emitter 852 at the fiber optic probe 114. The emitter 852 may comprise an end of the fiber optic probe 114 that emits the optical energy 854. The optical energy 854 is capable of exiting the sheathe 470 because slots 732 at the sheathe and slots 862 at the bushing 860 align with emitter 852. Effectively, slots 732 facilitate anchoring the hand tool 110 by extending the prongs 734, while slots 862 operate as windows that enable optical energy 854 to pass from the fiber optic probe 114 to the wall 132 of the hole 130. Hence, sheathe 470 and bushing 860 do not interfere with the passage of the optical energy 854 from the fiber optic probe 114 to the wall 132 of the hole 130, even though the fiber optic probe 114 travels within the sheathe 470 and the bushing 860 as part of the scanning process.

In FIG. 9, sheathe 470 has been extended through the hole 130 while in the extended position 890 by the operation of pneumatic pressure 1422 (FIG. 14) upon the piston 842. This enables the prongs 734 of the sheathe 470 to travel through the hole 130. In FIG. 10, the pneumatic pressure 1422 (FIG. 14) is released, causing piston 842 to move upwards in direction 1000. This retracts the sheathe 470, causing the prongs 734 to spread outward and grip the distal end 836 of the hole 130 as sheathe 470 slides over bushing 860. That is, force pulling the prongs 734 against the hole are responded to by endplate 460, which clamps the hand tool 110 within the hole 130. At this point in time, fiber optic probe 114 has not yet extended, and remains poised in position close to the endplate 460.

While the sheathe 470 is retracted, fiber optic probe 114 is held in position to extend through the hole 130 without contacting the hole. During extension and retraction of the fiber optic probe 114, body 730 of sheathe 470 prevents the fiber optic probe 114 from touching the walls 132 and/or contacting sealant or other Foreign Object Debris (FOD) at the hole 130. Thus, operation of motor 450 of FIG. 4 drives assembly 540 of FIG. 5 (and hence fiber optic probe 114) downwards in direction 1010. The fiber optic probe 114 performs LCI scanning of the hole as it is extended and/or retracted by the motor 450, in order to acquire a profile 128 that measures distance to a wall 132 of the hole 130 across a variety of depthwise positions 145. Specifically, the fiber optic probe 114 operates as a conduit for optical energy 854 such as a fiber optic line, and this optical energy 854 proceeds to and from a control unit 120 (e.g., via one or more of umbilicals 312 and/or 314) for measurement and analysis by the control unit 120.

Figure 11A:
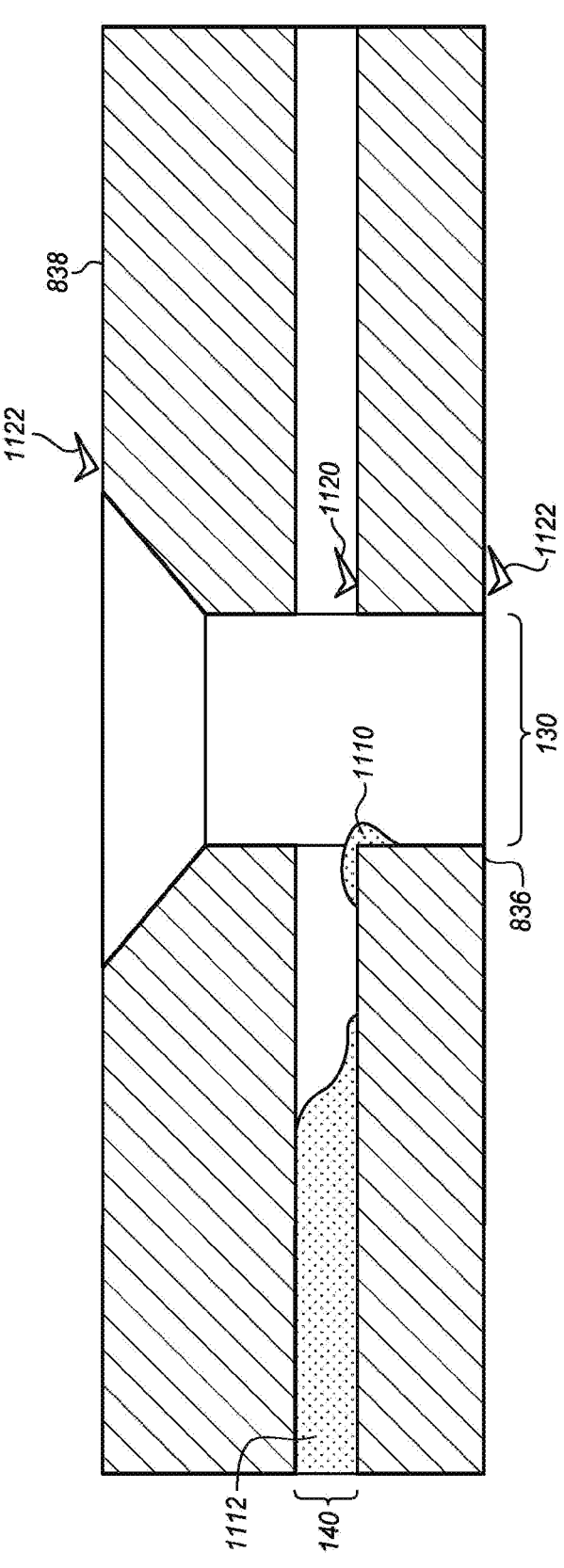
FIG. 11A depicts the presence of sealant and Foreign Object Debris (FOD) at an interface gap of a hole in an illustrative embodiment.

FIG. 11A depicts the presence of sealant 1110 and 1112, as well as Foreign Object Debris (FOD) such as FOD 1120 and FOD 1122 at an interface gap 140 of a hole 130 in an illustrative embodiment. FIG. 11A makes clear that elements such as FOD 1120 and sealant 1110 and 1112 may partially obstruct an interface gap 140. Understanding where sealant 1110 and 1112 are disposed within the interface gap 140, if at all, facilitates the process of deciding whether a shim is needed for the interface gap 140, and if so, what size. Hence, interferometry may be performed via a fiber optic probe 114 to acquire a surface map (not shown) within the hole 130 in order to detect these conditions. Furthermore, such techniques may be utilized to detect the presence of FOD 1122 external to the hole 130, such as at a proximate end 838 or distal end 836. Specifically, if distances determined via interferometry are shorter than expected (e.g., shorter than detection limits) beyond a distal end 836 of the hole 130, this indicates that FOD 1122 is present.

Figure 11B:
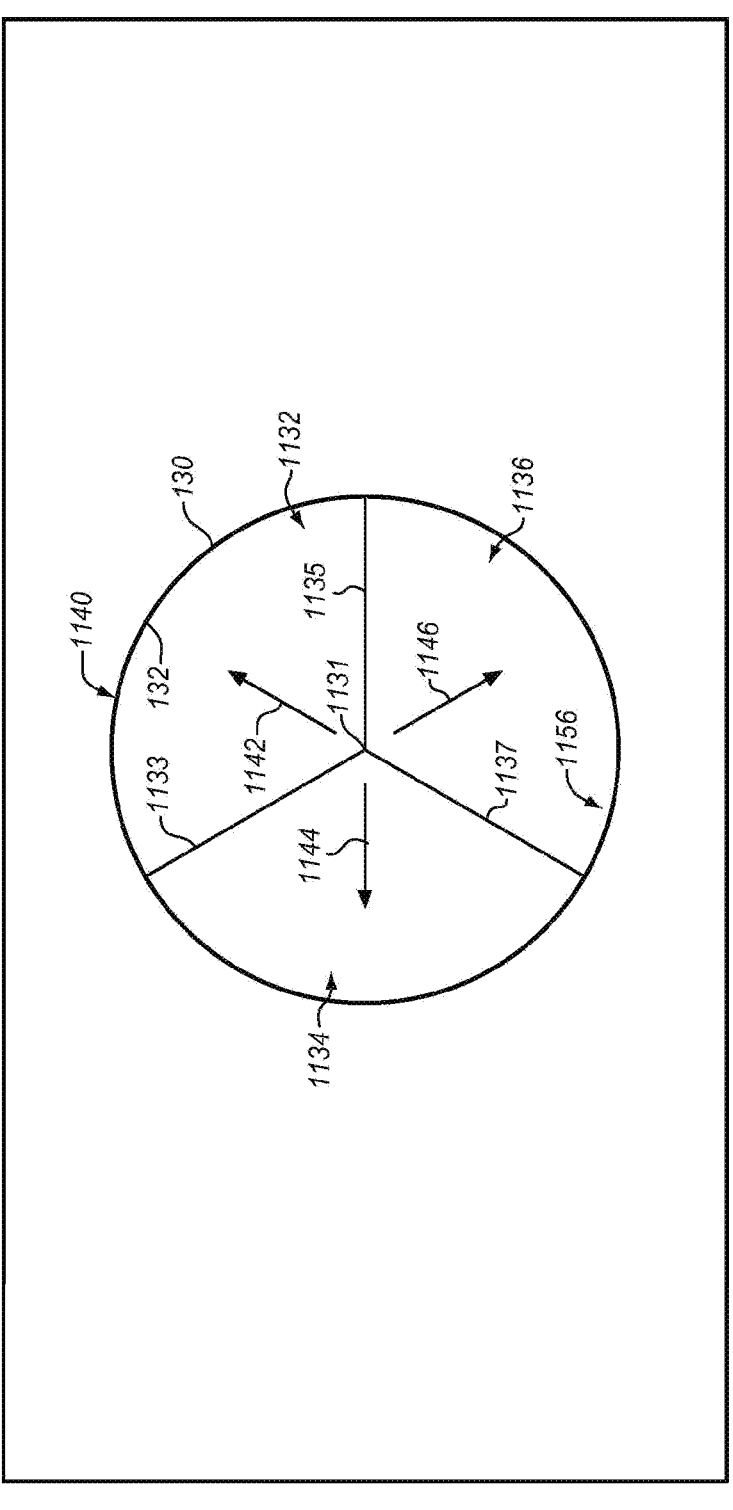
FIG. 11B depicts fields of view of a fiber optic probe inserted into a hole in an illustrative embodiment.

FIG. 11B depicts fields of view 1132, 1134, and 1136 of a fiber optic probe 114 inserted into a hole 130 in an illustrative embodiment. The fields of view 1132, 1134, and 1136 each correspond with a circumferential portion 1156 of a wall 132 of the hole 130, as viewed from a fiber optic probe 114 disposed at a center 1131 of the hole 130, and are each one hundred and twenty degrees. The fields of view 1132, 1134, and 1136 may be any suitable number of degrees, such as ninety, one hundred and twenty degrees, or one hundred and eighty, depending on a geometry of the fiber optic probe 114, slots 732 and/or slots 862. The fields of view 1132, 1134, and 1136 end at boundaries 1133, 1135, and 1137. In one embodiment, the dimension 142 of the interface gap 140, if any, is not known exactly until hand tool 110 is used to measure the interface gap 140. The interface gap 140 may not be uniform over the circumference 1140 of the hole 130. Thus, the interface gap 140 could be tapered in one circumferential portion 1156 of the hole 130 but may be thicker in another. The taper may be from thicker to thinner or vice versa). Therefore, if a field of view 1132 is acquired in a first scan by extending and retracting a fiber optic probe 114, additional scans may be required, by rotating the hand tool 110, and extending and retracting the fiber optic probe 114 again to acquire data for another of circumferential portions 1156. In one embodiment, the sums of the fields of view 1132, 1134, and 1136 of the scans do not have to add up to a full three hundred and sixty degrees for each of hole 130. Thus, an operator may strategically select locations/angles for the field of view 1132 for each scan. A field of view 1132 may even overlap with prior ones of fields of view 1134 and 1136 for a hole 130, if desired by the operator.

By performing multiple extensions and retractions of the fiber optic probe 114 while pointed in different directions 1142, 1144, and 1146, a series of profiles 128 and/or surface maps (not shown) may be acquired for a hole 130. The profiles 128 may be generated based on analysis of signals and/or data received at a controller 122 of the control unit 120 from the hand tool 110, such as optical energy 854 received via fiber optic probe 114. These profiles 128, and/or analyses thereof, may then be presented to the operator of the hand tool 110 via control unit 120, such as by presenting the profile 1300 of FIG. 13

Figure 12:
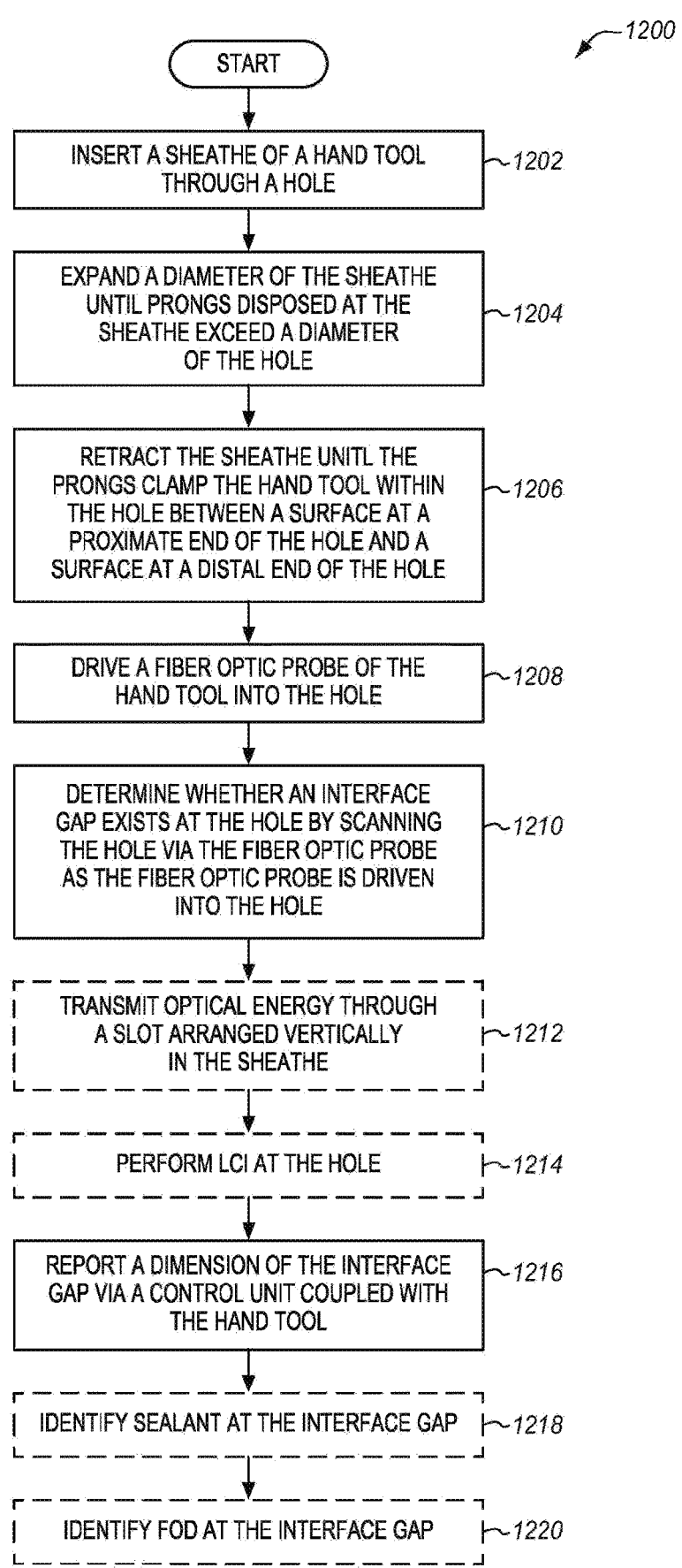
FIG. 12 is a flowchart illustrating a further method for operating a hole measurement system in an illustrative embodiment.

FIG. 12 is a flowchart illustrating a further method 1200 for operating a hole measurement system 100 to measure a hole 130 in an illustrative embodiment. Method 1200 includes inserting 1202 a sheathe 470 of a hand tool 110 through the hole 130. This operation may be performed by pressing the trigger 430 in order to cause the pneumatic pressure 1422 (FIG. 14) to drive the piston 842 to extend the sheathe 470, and then pushing sheathe 470 into the hole 130. In one embodiment, pressing the trigger 430 sends a control signal to the control unit 120, which causes pneumatic pressure 1422 (FIG. 14) to be applied via umbilical 314 and/or umbilical 312. The pressure is transferred to an interior 846 of the barrel 310, which drives the piston 842. The driving of piston 842 extends the sheathe 470.

The method 1200 further includes expanding 1204 a diameter 870 of the sheathe 470 until prongs 734 disposed at the sheathe 470 exceed a diameter 832 of the hole 130. In this embodiment, this comprises retracting sheathe 470, which causes prongs 734 to slide along bushing 860 and spread apart while the prongs 734 disposed beyond the distal end 836 of the hole 130 (i.e., entirely through the hole 130).

The method 1200 also includes retracting 1206 the sheathe 470 until the prongs 734 do clamp the hand tool 110 within the hole 130 between surface 816 at the proximate end 838 of the hole 130 and the surface 817 at the distal end 836 of the hole 130. For example, when the trigger 430 is released, or a set period of time after pressing the trigger 430, the piston 842 returns. Thus, hand tool 110 is clamped into place by sandwiching the distal end 836 and the proximate end 838 of the hole 130 while the sheathe 470 is extended through the through the hole 130. Thus, in some embodiments, an Outer Mold Line (OML) defined by surface 816 and an Inner Mold Line (IML) defined by surface 817 surrounding the hole 130 are clamped to the hand tool 110. In one embodiment, expanding and retracting are performed via the same operation, while in other embodiments, these are separately performed operations.

The method further includes driving 1208 a fiber optic probe 114 of the hand tool 110 into the hole 130. In one embodiment, this comprises pressing a button (not shown) at the control unit 120 that causes the control unit 120 to activate the motor 450 of the hand tool 110. Activation of the motor 450 extends and then retracts the fiber optic probe 114. That is, the driving of the fiber optic probe 114 is automatically controlled by controller 122 at a desired rate of plungering, for example based on Numerical Control (NC) program instructions in memory 124. Hence, the fiber optic probe 114 is capable of being reliably and predictably extended in a uniform manner, regardless of the hole 130 that is being measured. Note that the extension of the fiber optic probe 114, being performed by motor 450, is a separate process from the clamping action performed by the piston 842 in response to pneumatic pressure 1422. In further embodiments, a rate of extension ("plungering") of the fiber optic probe 114 is adjustable by the control unit 120 and/or a technician as desired. In some embodiments, the rate of extension may even be adjusted in real time, such as in order to inspect certain ranges of depthwise positions 145 with greater scrutiny. In still further embodiments, at certain predefined and/or dynamically determined ones of depthwise positions 145, the fiber optic probe 114 pans/rotates to scan a larger field of view, or multiple fields of view. This may facilitate scanning a particular feature that surrounds the fiber optic probe 114.

Additionally, the method 1200 includes, at 1210 determining whether an interface gap 140 exists at the hole 130 by scanning the hole 130 via the fiber optic probe 114 as the fiber optic probe 114 is driven into the hole 130. In one embodiment, this comprises optionally activating 1212 the fiber optic probe 114 to transmit optical energy 854 through a slot 732 that is axially arranged at the sheathe 470. This operation may further comprise optionally performing 1214 interferometry, such as performing LCI at the hole 130, to determine distances 133 measured by the fiber optic probe 114 at a one of depthwise positions 145 that varies. In such embodiments, optical energy 854 travels and is reflected off of walls 132 in the hole 130. The optical energy 854 then returns to the fiber optic probe 114 (e.g., a fiber optic line) and continues via one or more of umbilicals 312 and 314 until reaching the control unit 120. Measurements of the optical energy 854 received at the control unit 120, in accordance with LCI techniques, may then be utilized to measure the distances 133 of FIG. 1. By correlating measured ones of distances 133 to depthwise positions 145 based in input from motor 450, a profile 128 of depthwise positions 145 and distances 133 is created.

Steps 1208-1210 may be repeated any suitable number of times with the fiber optic probe 114 pointed in any suitable directions in order to acquire multiple profiles of the hole 130. For example, steps 1208-1210 may be repeated for each descent and/or retraction of the fiber optic probe 114 within the hole 130. Thus, it is potentially possible to descend with one field of view 1132 and then turn or rotate the fiber optic probe 114 relative to the hole 130 to scan a field of view 1134 during retraction up through the hole 130.

In further embodiments, method 1200 includes reporting, at step 1216, a dimension 142 of the interface gap 140 via a control unit 120 coupled with the hand tool 110 such as by updating a display (e.g., display 1403 of FIG. 14) at the control unit 120. In one embodiment, this comprises displaying a dimension 142 of the interface gap 140 textually or visually via a screen at the control unit 120. In a further embodiment, this comprises displaying the depthwise positions 145 which form the boundaries of the interface gap, via the screen. Additional operations may include optionally identifying, at step 1218, sealant 1110 at the interface gap 140, and optionally identifying 1220 the existence of Foreign Object Debris (FOD) such as FOD 1120 at the interface gap 140. For example, thresholding may be performed for distances 133 in order to infer the presence of such elements. If a distance 133 is beyond a threshold amount, this may be indicative of the presence of sealant 1110 or FOD 1120. These operations may be performed based on a comparison between actual and expected distances, as will be described with regard to FIG. 13 below.

Figure 13:
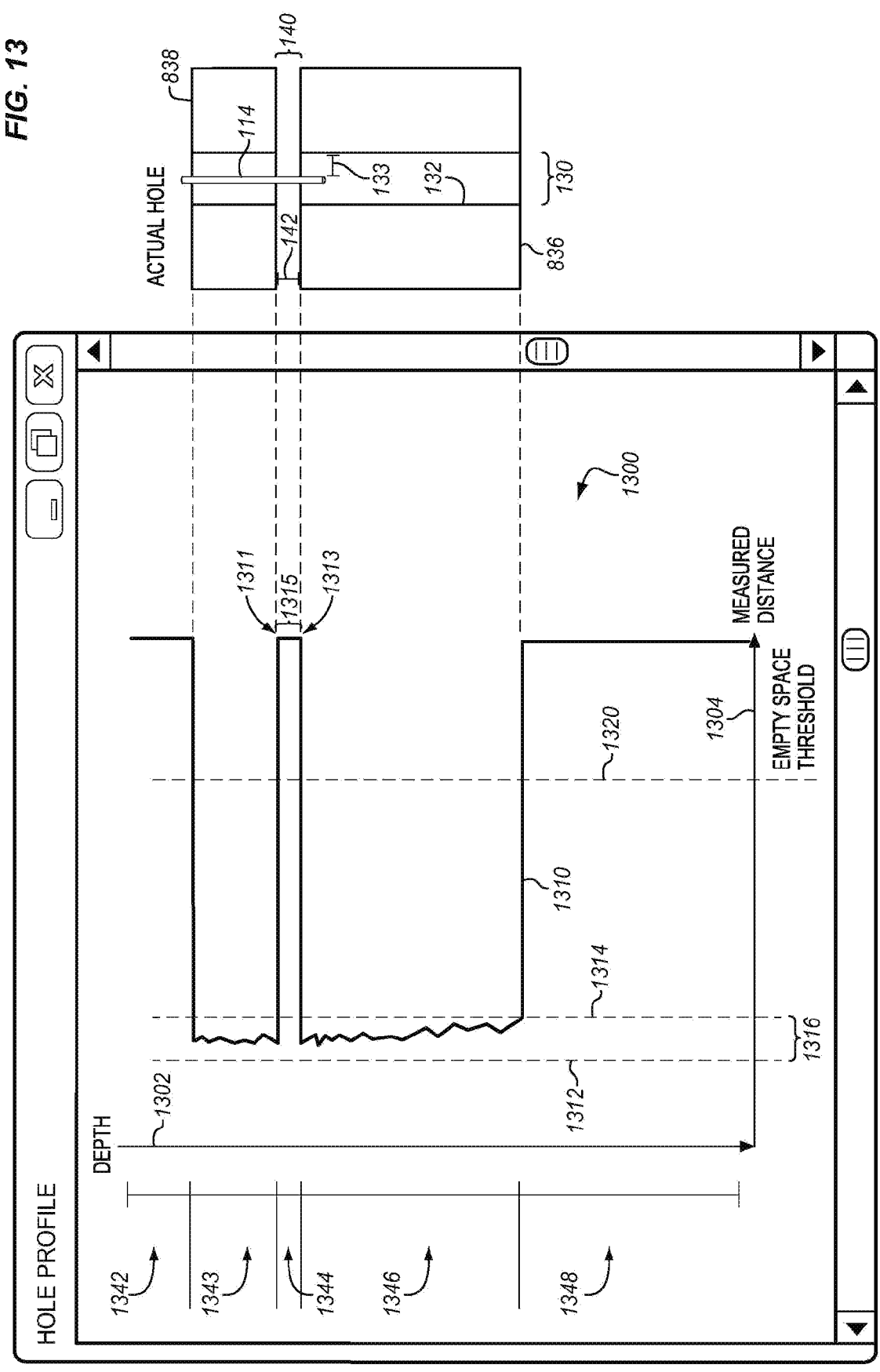
FIG. 13 depicts a profile generated based on input from a fiber optic probe in an illustrative embodiment.

FIG. 13 depicts a profile 1300 generated based on input from a fiber optic probe 114 in an illustrative embodiment.

Depending on embodiment, a profile 1300 may be presented via a control unit 120 or may be transmitted to a handheld device of a technician, or may be foregone such that only a measurement of interface gap 140 is provided. For example, profiles 1300, distances 133, and/or real-time images generated based on input from the fiber optic probe 114 may be provided to an operator for review, such as via a feedback device or monitor (not shown).

Profile 1300 includes measurements 1310 of distance 133 acquired at depthwise positions 145 as a fiber optic probe 114 travels along a hole 130. Distances 133 are determined based on interferometry, while a one of depthwise positions 145 is determined based on input from scale 440 of FIG. 4. In this embodiment, a one of depthwise positions 145 into the hole 130 increases in the downward direction 1302, and measured distance increases in the rightward direction 1304. Measurements 1310 beyond threshold 1320 indicate distances 133 beyond a detection range of the fiber optic probe 114.

During operation, the fiber optic probe 114 is expected to proceed through a region 1342 prior to a proximate end 838 of the hole 130, then to enter a region 1343 within the hole 130, then to encounter one or more of regions 1344 indicative of an interface gap 140, followed by one or more regions 1346 within the hole 130, and finally to exit the hole 130 into a region 1348 beyond a distal end 836 of the hole 130. Although the fiber optic probe 114 exits the distal end 836 of the hole 130 in this embodiment, in further embodiments this action is not required.

Based on this knowledge, measurements 1310 are expected to start beyond the threshold 1320, prior to the fiber optic probe 114 entering the hole 130. Then, measurements 1310 are expected to be within a region 1316 bounded by thresholds 1312 and 1314. These thresholds 1312 and 1314 represent expected distances 133 to reach a wall 132 of the hole 130. If the measurements 1310 are outside of the region 1316, but not beyond threshold 1320, this indicates the existence of FOD 1120 and/or sealant 1110 at the hole. Alternatively, if measurements 1310 are beyond threshold 1320 after they have been measured within region 1316, this indicates the presence of an interface gap 140. One or more interface gaps 140 may be detected in this manner, separated by one or more regions 1346 indicative of walls of the hole 130. A controller 122 measures a dimension 142 of each interface gap 140 by determining a difference in depth between a first measurement 1311 beyond the threshold 1320 and a last measurement 1313 (in a series of measurements 1315) beyond the threshold 1320. Finally, the detection of a measurement 1310 beyond the threshold 1320, which is not followed by detection of a measurement 1310 less than the threshold 1320, corresponds with the fiber optic probe 114 having reached beyond a distal end 836 of the hole 130, without detecting any FOD or sealant beyond the distal end 836. In further embodiments, measurements 1310 are filtered such that outlier readings within a local region are ignored, or such that measurements 1310 are otherwise smoothed or normalized.

Figure 14:
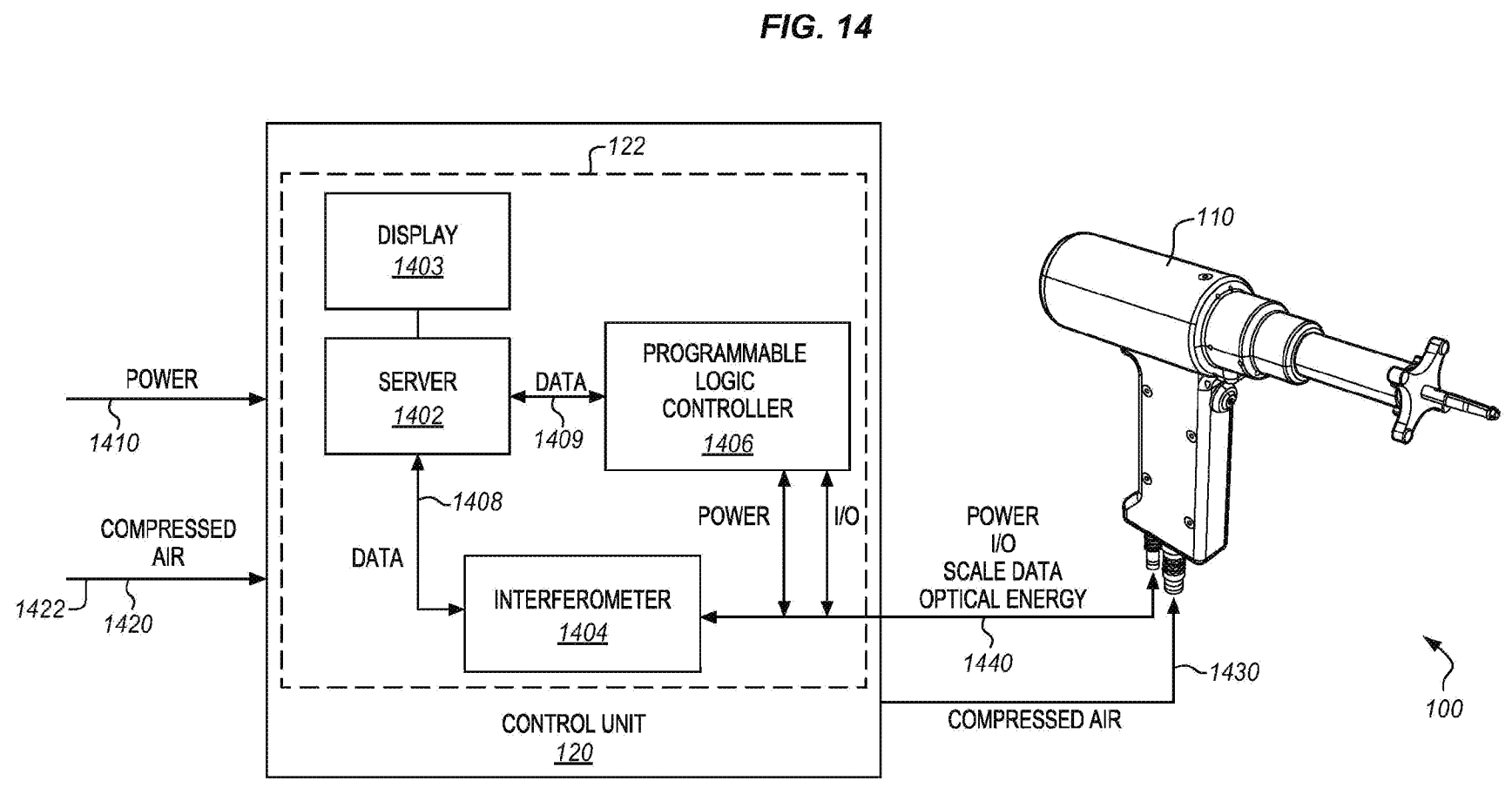

FIG. 14 is a functional diagram depicting internal components of a hole measurement system 100 in an illustrative embodiment. In this embodiment, control unit 120 receives electrical power via power line 1410, and is coupled with a pressurized air supply (e.g., shop air) via compressed air line 1420 at pneumatic pressure 1422.

The hand tool 110 is coupled with umbilical 1430, which provides pneumatic pressure 1422, and is also coupled with umbilical 1440 which comprises one or more electrical connections for receiving power and instructions, and/or exchanging data with programmable logic controller 1406. In this embodiment, umbilical 1440 also includes a fiber optic line (not shown) which conveys optical energy 854 between interferometer 1404 and hand tool 110.

The control unit 120 includes a controller 122 in the form of a server 1402 coupled with a display 1403 (e.g., a screen, touchscreen, etc.). Because the display 1403 is located remotely from the operator in this embodiment, the display 1403 may store the profiles 128 for later viewing by an operator, may display the profiles 128 to another operator at the control unit 120, or may even transmit the profiles 128 for display at a mobile device (e.g., tablet) of the operator. The server 1402 processes input from interferometer 1404 via data line 1408 to determine measurements 1310, and correlates measurements 1310 with data received from scale 440 as reported by programmable logic controller 1406 over data line 1409. The programmable logic controller 1406 provides power to scale 440 and/or motor 450 via umbilical 1440, and receives data for reporting to server 1402.

Based on the information provided to server 1402, server 1402 may update display 1403 in order to present one or more profiles (e.g., profile 1300) each time a hole 130 is measured. Server 1402 may further annotate and/or report measurements of a dimension 142 of an interface gap 140, based on received data.

Turning now to FIG. 15, an illustration of an aircraft 1500 is depicted for which the fabrication systems and methods described herein may be implemented in an illustrative embodiment. In this illustrative example, aircraft 1500 includes wing 1550 and wing 1560 attached to fuselage 1524 having a nose 1520. Aircraft 1500 includes engine 1540 attached to wing 1560 and engine 1530 attached to wing 1550. Tail section 1580 is also attached to fuselage 1524. Horizontal stabilizer 1581, horizontal stabilizer 1582, and vertical stabilizer 1583 are attached to tail section 1580 of fuselage 1524. The fuselage 1524 itself is formed from multiple barrel sections 1522 which have been joined together. In this embodiment, three of barrel sections 1522 are labeled, but any suitable number of barrel sections may be utilized to form the fuselage 1524 as a matter of design choice. Hand tool 110 may be utilized, for example, to measure any ones of holes 130 disposed at joints 1526 between barrel sections, at joints 1526 along wings 1560 and 1550, or in any other suitable locations (e.g., joints, seams, etc.) at the airframe.

Figure 16:
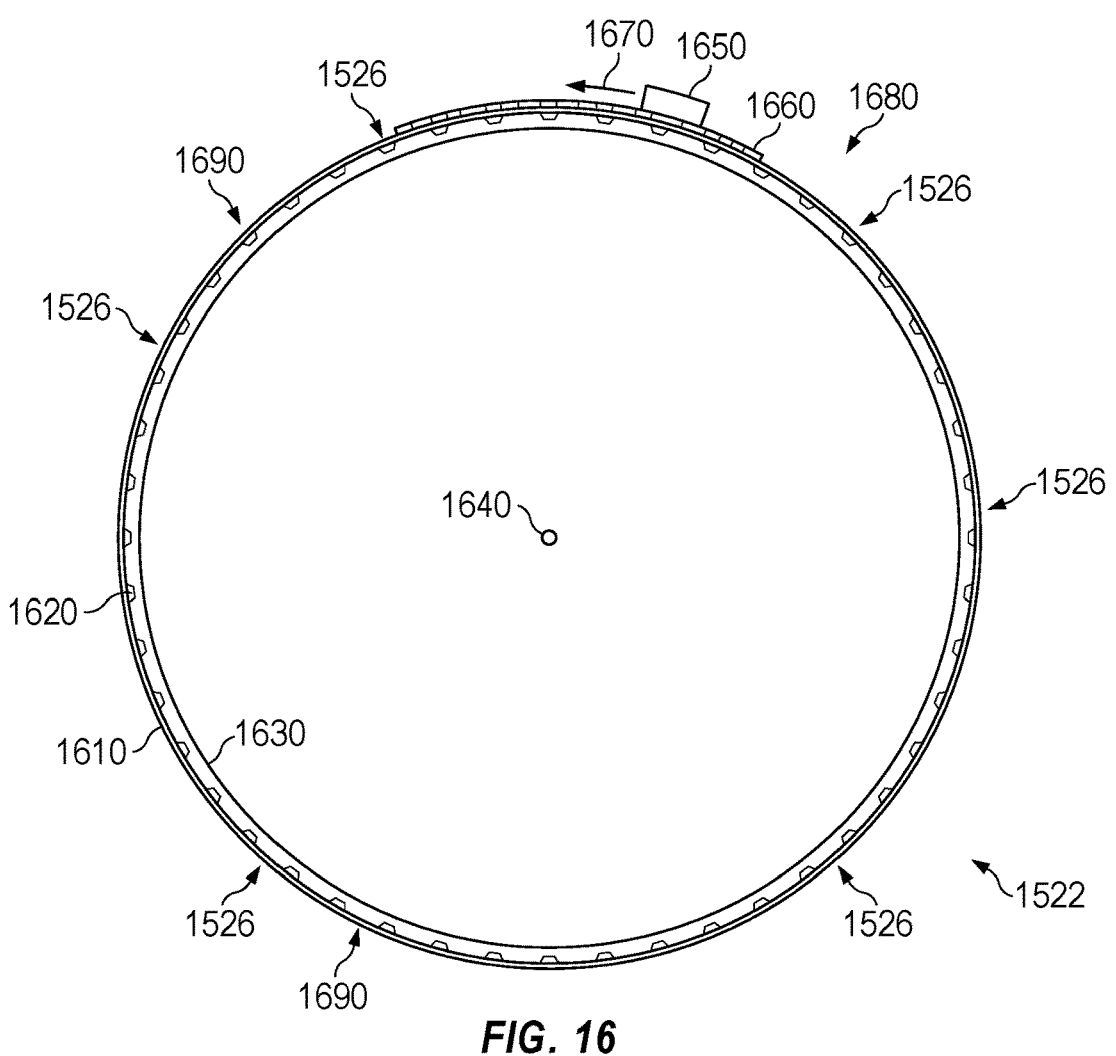
FIG. 16 is a section cut view of a barrel section of an aircraft in an illustrative embodiment, also showing movement of a robot over the circumference of the barrel section.
Figure 25:
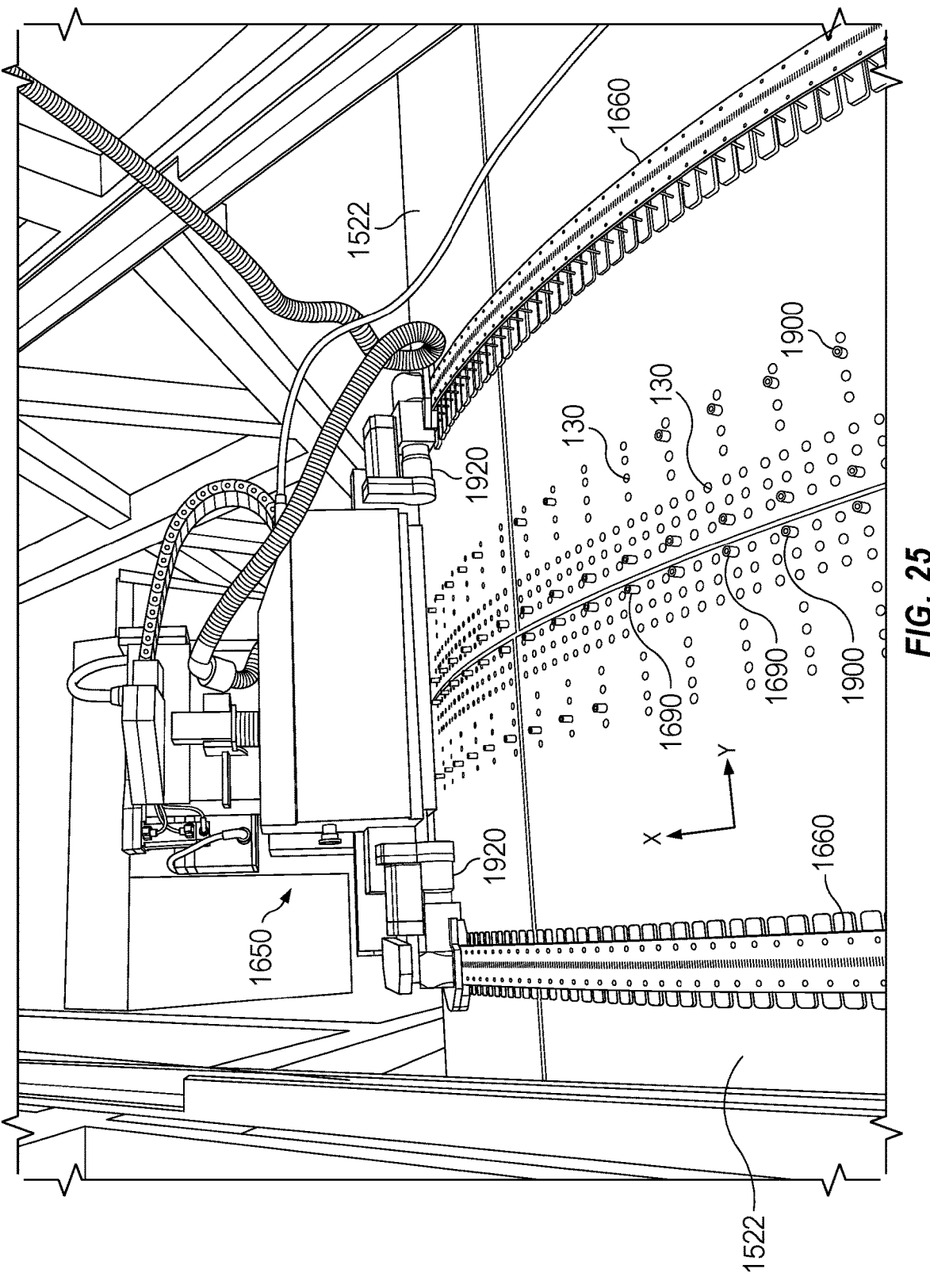
FIG. 25 is a perspective view of the robot moving over a barrel section in which temporary fasteners have been installed that tack the barrel sections together.
Figure 26:
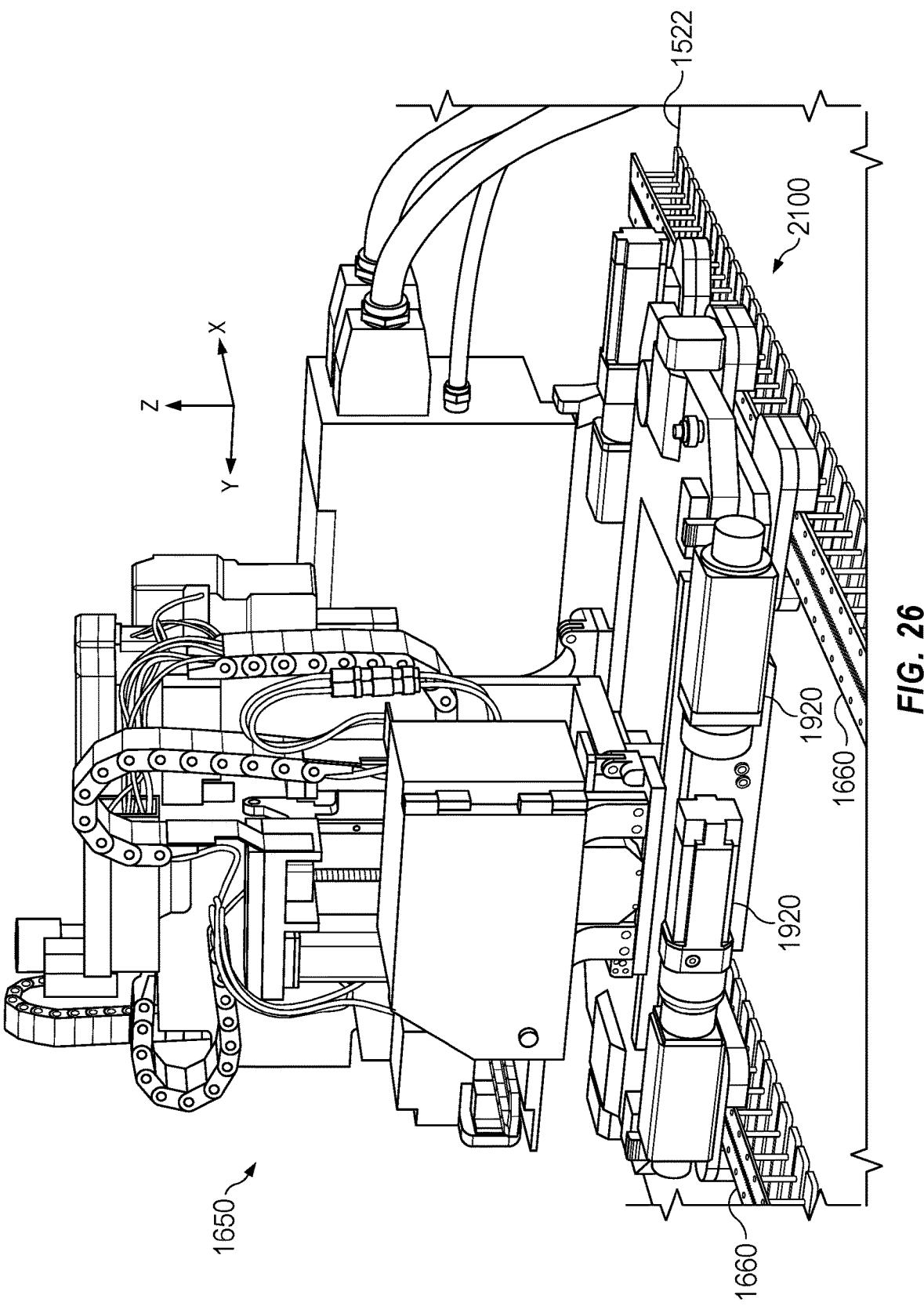
FIG. 26 is a perspective view showing one end of the robot.

FIG. 16 is a cross sectional view of a barrel section 1522 of an aircraft 1500 in an illustrative embodiment. In this embodiment, barrel section 1522, is arranged radially about a point 1640, and includes a skin 1610, stringers 1620, and frames 1630. The various techniques discussed above may be applied to measure holes used for fastening any component of an airframe, including barrel sections, wings, and other portions of an airframe. In this Figure, it can be seen that the joint 1526 proceeds circumferentially about the barrel section 1522. The barrel sections 1522 are joined to underlying structures such as a frame or stringer by fasteners 1900 (see FIG. 25) at various fastening locations 1690 around the circumference of the barrel section 1522. The fasteners 1900 pass through holes 130 in the barrel sections 1522 and the underlying structure. Measurement of interface gaps between the sheets 152, 154 formed by the barrel section 1522 and the underlying structure are performed using a gap measurement end effector 1700a (FIGS. 19 and 20) carried on a robot 1650 which moves over the circumference of the barrel section 1522. As will be discussed in more detail below, the robot 1650 is mounted for movement 1670 along and guided by a set of flexible tracks 1660 that is removably mounted on the barrel section 1522. Operation of the gap measurement end effector 1700*a* is coordinated with the operation of other, later discussed end effectors 1700 (FIGS. 21 and 22) carried on the robot 1650 which may perform operations such as hole drilling, hole diameter measurement, and insertion of temporary and/or permanent fasteners.

Figure 17:
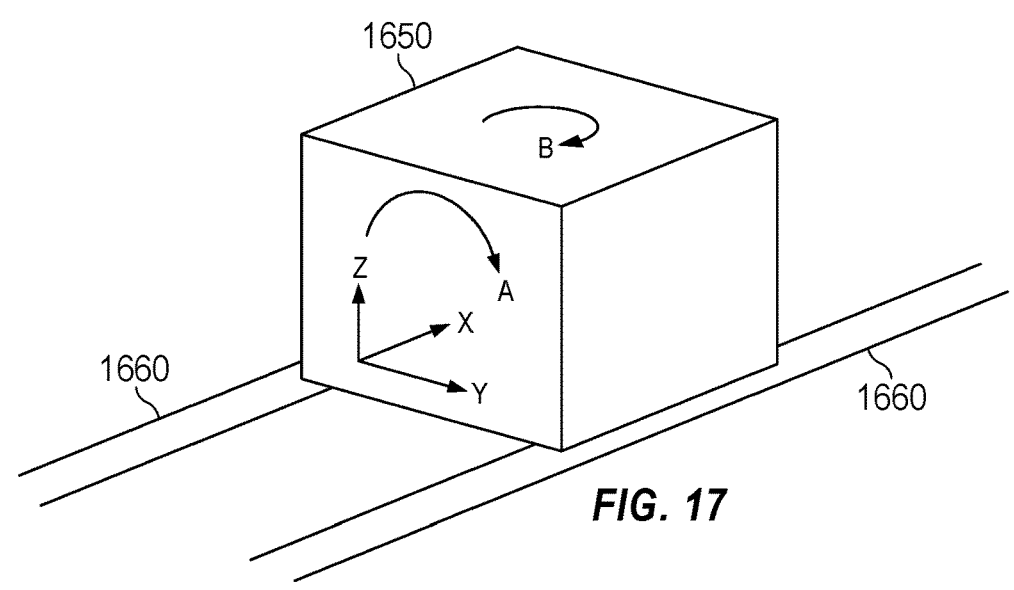
FIG. 17 is a diagrammatic, perspective view of the robot showing various axes of movement and rotation.

FIG. 17 diagrammatically illustrates the axes along which the robot 1650 may move and rotate. For example, robot 1650 is guided by the flexible tracks 1660 to move circumferentially along an X axis, while a later discussed slide assembly 1820 (FIG. 22) may move the end effectors 1700 laterally along a Y axis. The end effectors 1700 are individually mounted for vertical movement along a Z axis. The robot 1650 includes a carriage 1810 (FIG. 22) that may tilt around rotational axis A and/or twist about rotational axis B.

Attention is now directed to FIG. 18A which broadly illustrates the steps of a method of joining barrel sections 1522 together using an automated technique to measure the size of gaps between sheets 152, 154 respectively formed by the barrel sections 1522 and the underlying structure to which each of them is fastened. Beginning at 1802, holes 130 are manually drilled in the subcomponents which, in this case are sheets 152, 154, and temporary fasteners are installed in these holes 130 which tack down the sheets 152, 154. At 1804, a robot 1650 is employed to automatically drill additional holes 130 in the sheets 152, 154 and install additional temporary fasteners 1900 that further tack the sheets 152, 154. At 1806, any interface gaps that may exist between the sheets 152, 154 are measured using a gap measurement end effector 1700*a* (FIGS. 19 and 20) that is carried on and controlled by the robot 1650. At 1808, shims are fabricated having sizes and thicknesses based on the gap measurements automatically performed by the gap measurement end effector 1700*a* at step 1806. At 1810, the shims are installed within the gaps. At 1812, full-size holes 130 are drilled in the sheets 152, 154, following which the diameters of the holes 130 are measured to assure that they are within desired tolerances. Optionally, at 1814, the interface gaps 140 between the sheets 152, 154 through the full-size holes 130 may be re-measured to verify that any remaining gaps are within the desired tolerances. At 1816, permanent fasteners 1900 are automatically installed in the full-size holes 130 using an end effector 1700 on the robot 1650. It should be pointed out here that the steps shown at 1804, 1806, 1812, 1814 and 1816 are each carried out automatically using end effectors 1700 on the robot, including the gap measurement end effector 1700*a*. Also, as will be discussed later below, in other examples, some of the functions described such as hole drilling, hole size measurement and fastener insertion may be performed manually, automatically or semi-automatically using equipment other than the end effectors 1799 on the robot 1650.

Attention is now directed to FIG. 18B which broadly illustrates how the method shown in FIG. 18A can be performed using specialized end effectors carried on a robot 1650. At 1818, the robot 1650 is moved over sheets 152, 154 of material that are to be joined together. 1820, pilot holes are drilled through the sheets 152, 154 of material using an automatically controlled drill end effector 1700*c* (FIGS. 21 and 22) on the robot 1650. At 1822, interface gaps 140 between the sheets 152, 154 of material are measured within the pilot holes, using a gap measurement end effector 1700*a* on the robot 1650. At 1824, shims are made that have sizes based on the interface gap measurements performed at 1822. At 1826, the shims are installed in the interface gaps 140, following which at 1828, full-size holes 130 are drilled through the sheets 152, 154 of material using the automatically controlled drill end effector 1700*c* on the robot 1650. Finally, at 1830 fasteners 1900 are automatically inserted into the full-size holes 130 using a fastener insertion end effector 1700*d* on the robot 1650.

FIG. 18C broadly shows the steps of the method of measuring an interface gap 140 between sheets 152, 154 of material having a plurality of holes 130 therethrough. At 1832, a robot 1650 is moved over the sheets 152, 154 of material. At 1834 each of the holes 130, an interface gap 140 between the sheets 152, 154 of material is measured using a gap measurement end effector 1700*a* on the robot 1650.

Referring now to FIG. 18D, a method of joining two sheets of material together comprises, beginning at 1836, moving a robot 1650 over two sheets 152, 154 of material to each a plurality of fastening locations 1690. At 1838, at each of the fastening locations 1690, a hole 130 is drilled through the sheets 152, 154 of material. At 1840, an interface gap 140 between the sheets 152, 154 of material in each of the holes 130 is automatically measured using a gap measurement end effector 1700*a* on the robot 1650.

Figures 19, 20:
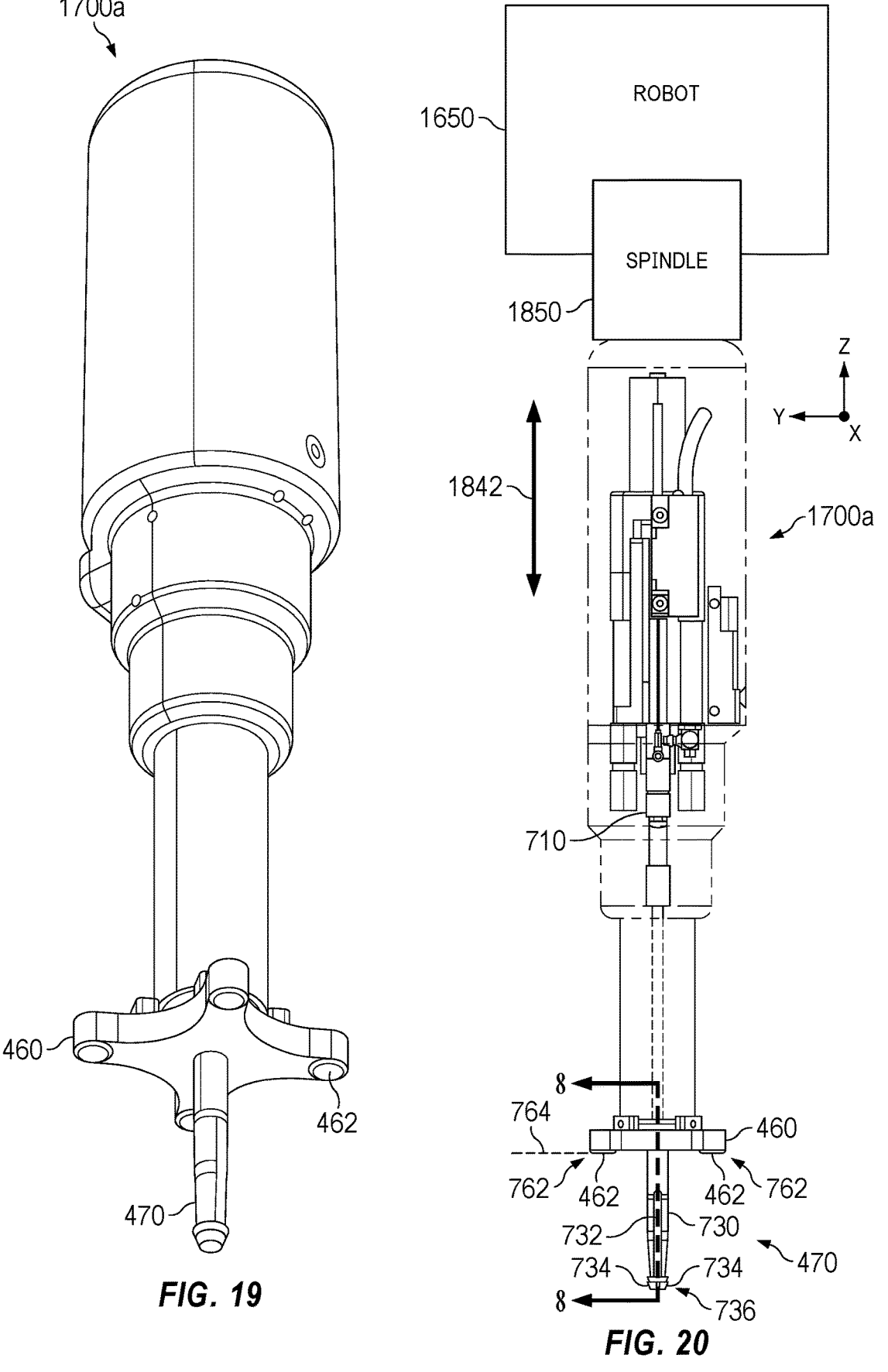
FIG. 19 is a perspective view of an alternate embodiment of a gap measurement tool used for fully automated gap measurement.
FIG. 20 is a combined block and sectional view of the gap measurement tool of FIG. 19 mounted as an end effector on a robot.

Referring to FIGS. 19 and 20, a gap measurement end effector 1700*a* may be essentially identical or similar in construction and operation to the hand tool 110 previously described in connection with FIGS. 3-10. However, whereas the hand tool 110 is manually operated by a technician in an operation that is separate from drilling of holes and insertion of fasteners, the gap measurement end effector 1700*a* is mounted on and controlled by robot 1650 which automatically displaces the gap measurement end effector 1700*a* up and down along the Z axis, causing the feet 462 to engage the surface of a barrel section 1522 and allow the sheath 470 to be inserted into the hole 130 through the sheets 152, 154 in order to carry out gap measurements. The gap measurement end effector 1700*a* is mounted on a spindle 1850 on the robot 1650 which rotates the fiber optic probe 114 in order to change the field of view of the fiber optic probe 114, as previously described on connection with FIG. 11B.

Figure 21:
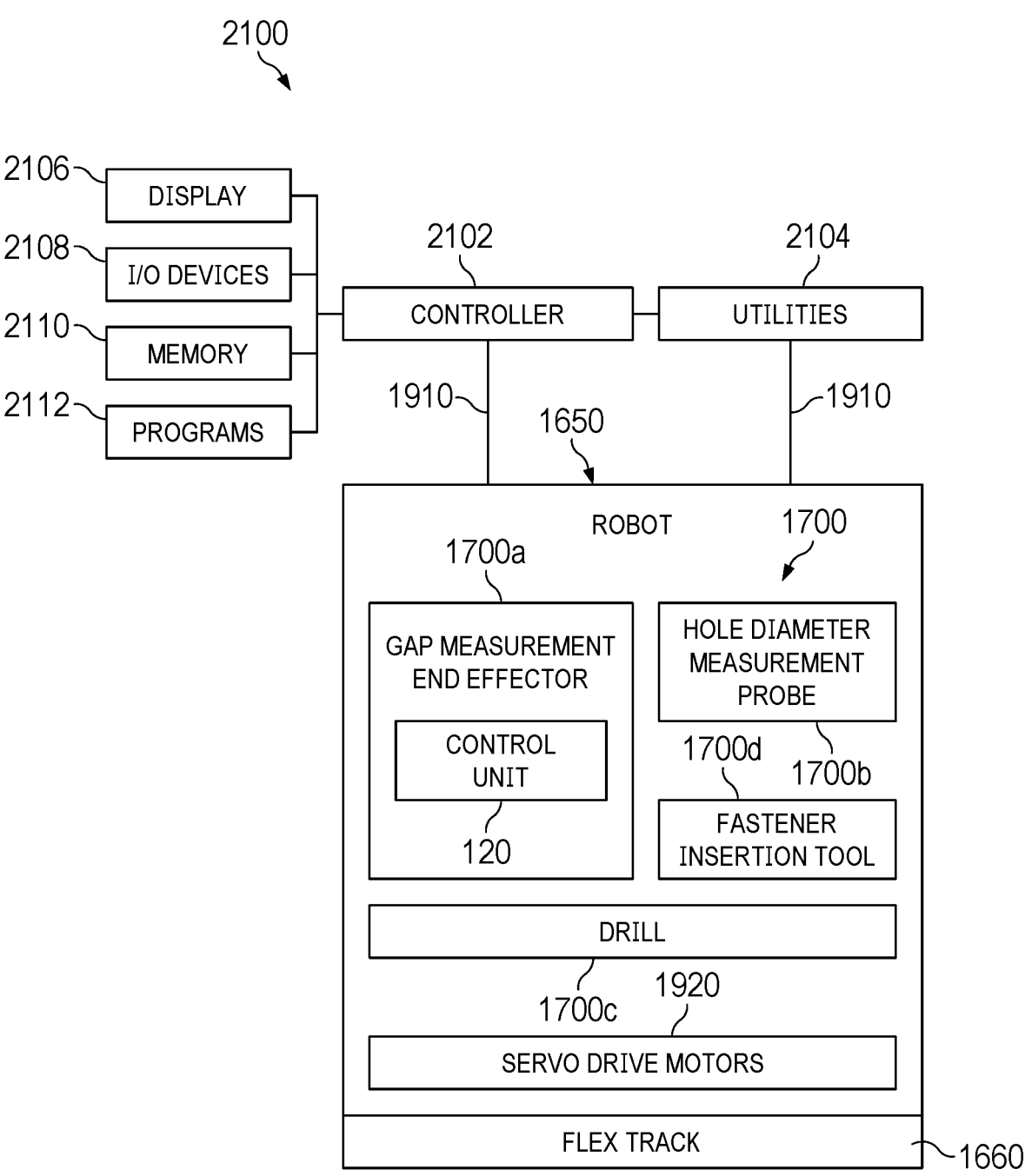
FIG. 21 is a functional block diagram of a system for automated assembly of barrel sections of an aircraft.

FIG. 21 broadly illustrates the components of a system 2100 for fastening two sheets of material together, The system can be used to automatically join the barrel sections 1522, or other sections of an aircraft 1500, particularly those having sheets 152, 154 that are curved and are to be joined to an underlying structure by fasteners. The system 2100 includes the previously mentioned robot 1650 operated by a controller 2102 which may comprise a PC, a programmable controller and/or one or more processors. The system 2100 may also control one or more utilities 2104 such as compressed air and/or hydraulic supplies, vacuum sources and electrical power which provide service to the robot 1650 and its on-board end effectors 1700 (discussed below). The controller 2102 as well as the utilities 2104 are coupled with the robot 1650 by umbilicals 1910 (also shown in FIG. 23). The system 2100 may also include one or more displays 2106, I/O devices 2108, one or more memories 2110, and one or more programs 2112 for controlling operation of the robot 1650 and its end effectors 1700, and for recording and comparing data, etc. As previously described, the robot 1650 is mounted on and movable along a set of flexible tracks 1660 that are removably attached to the barrel section 1522 or other parts of the aircraft 1500 where sheets 152, 154 of material are to be joined by fasteners. The end effectors 1700 may include, for example and without limitation, a gap measurement end effector 1700*a*, a hole measurement end effector 1700*b*, a drill end effector 1700*c* and a fastener insertion end effector 1700*d*. In another embodiment, the robot 1650 may include only a gap measurement end effector 1700*a*. The gap measurement end effector 1700*a* may essentially be identical in construction to the hand tool 110 previously described, except that the tool is adapted for use as an end effector on the robot 1650. The gap measurement end effector 1700*a* may include a control unit 120 that is substantially identical to that previously described in connection with FIG. 14. However in some embodiments, one or more functions of the control unit 120 may be incorporated into the controller 2102.

Referring now to FIGS. 22-30, each of the end effectors 1700*a*-1700*d* is mounted on a frame 2220 for independent vertical displacement 1842 along the Z axis. The frame 2220 supported on a slide assembly 1820 (FIGS. 22 and 30) that is mounted for sliding movement 1830 on a carriage 1810. The slide assembly 1820 allows the frame 2220 and thus the end effectors 1700 to be displaced laterally along the Y axis. Servo motors 1920 mounted on the carriage 1810 drive the robot 1650 along the flexible track 1660. Depending on the type and function of the end effector 1700, the end effector 1700 may include a suitable pneumatic or electric motor 2210 that rotates a spindle 1850 having a desired tool 1860 mounted thereon for performing gap measurements, drilling holes, measuring hole diameters or inserting fasteners.

Figure 22:
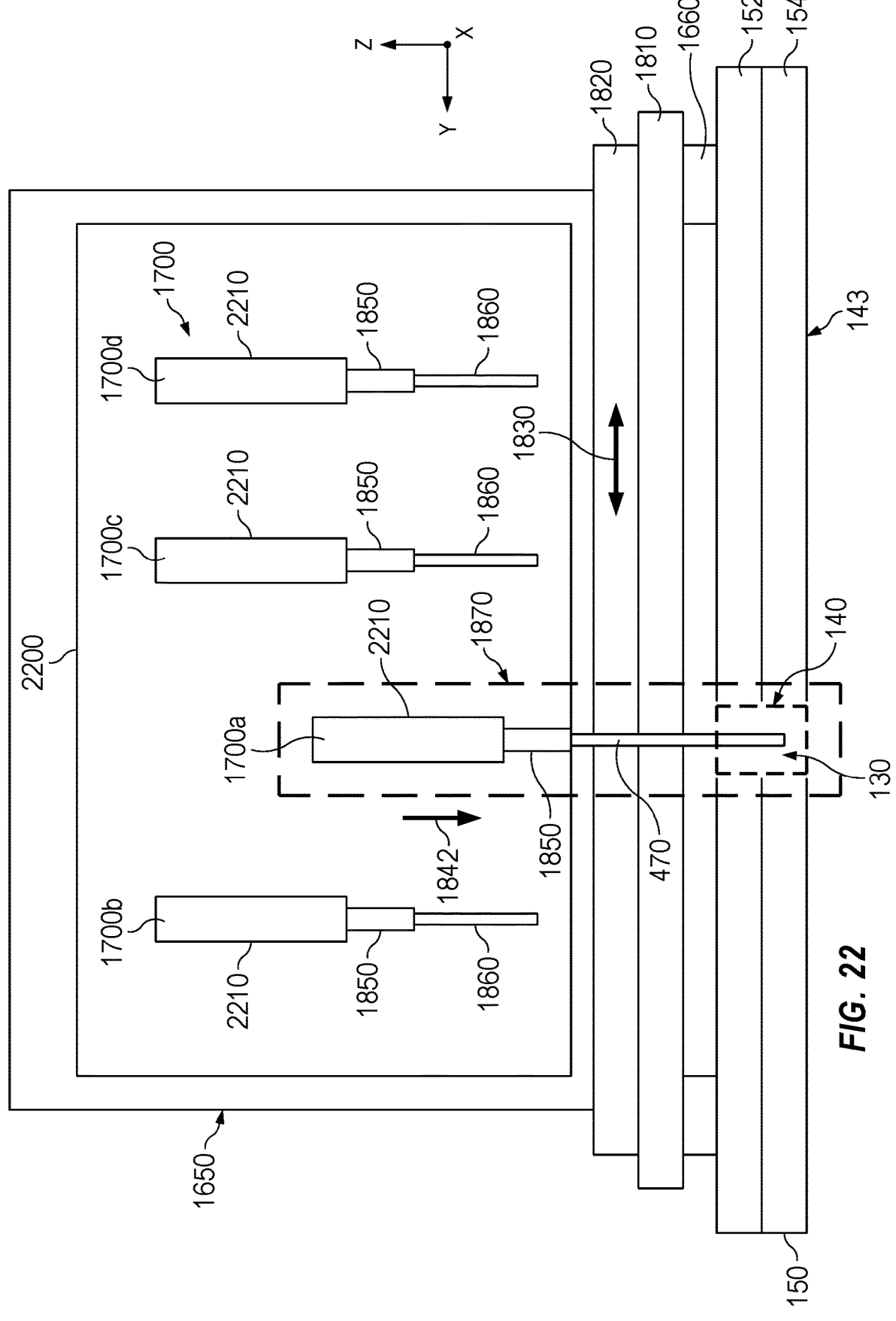
FIG. 22 is a diagrammatic side view of the robot illustrating the use of the gap measurement end effector along with other end effectors.

Attention is now particularly directed to FIG. 22 which diagrammatically illustrates several basic components of the robot 1650. As previously described, the robot 1650 may include one or more end effectors 1700, including, but not limited to a gap measurement end effector 1700*a*. Depending upon the construction and purpose of the end effector 1700, it may have a spindle 1850 and a tool 1860. For example, the spindle 1850 may rotate and the tool 1860 may comprise a drill. Other examples of end effectors 1700 have a tool 1860 that operates to measure the diameter of a hole 130 that has been drilled. Another example of an end effector 1700*d* may have a tool 1860 that inserts a temporary or permanent fastener 1900 into a hole 130 that has been drilled by a drill end effector 1700*c*. The end effectors 1700*a*-1700*d* are mounted on a slide assembly 1820 that is in turn, slidably mounted on an underlying carriage 1810 for movement in either direction along the Y axis. The slide assembly 1820 allows any one of the end effectors 1700*a*-1700*d* to be positioned above an area of the barrel section 1522 to be operated on. For example, the slide assembly 1820 allows the gap measurement end effector 1700*a* to be brought into vertical alignment with any one of the holes 130 at any of the fastening locations 1690. In the illustrated example, it can be seen that the gap measurement end effector 1700*a* has been positioned above and displaced downwardly from a raised standby position to a lowered gap measuring position, causing the sheath 470 to descend into a hole 130 through the sheets 152, 154, allowing an interface gap 140 between the sheets 152, 154 to be measured. The carriage 1810 is mounted on the flexible tracks 1660, and as previously described, allows the robot 1650 move incrementally over the circumference of a barrel section 1522 in the X direction.

Figure 23:
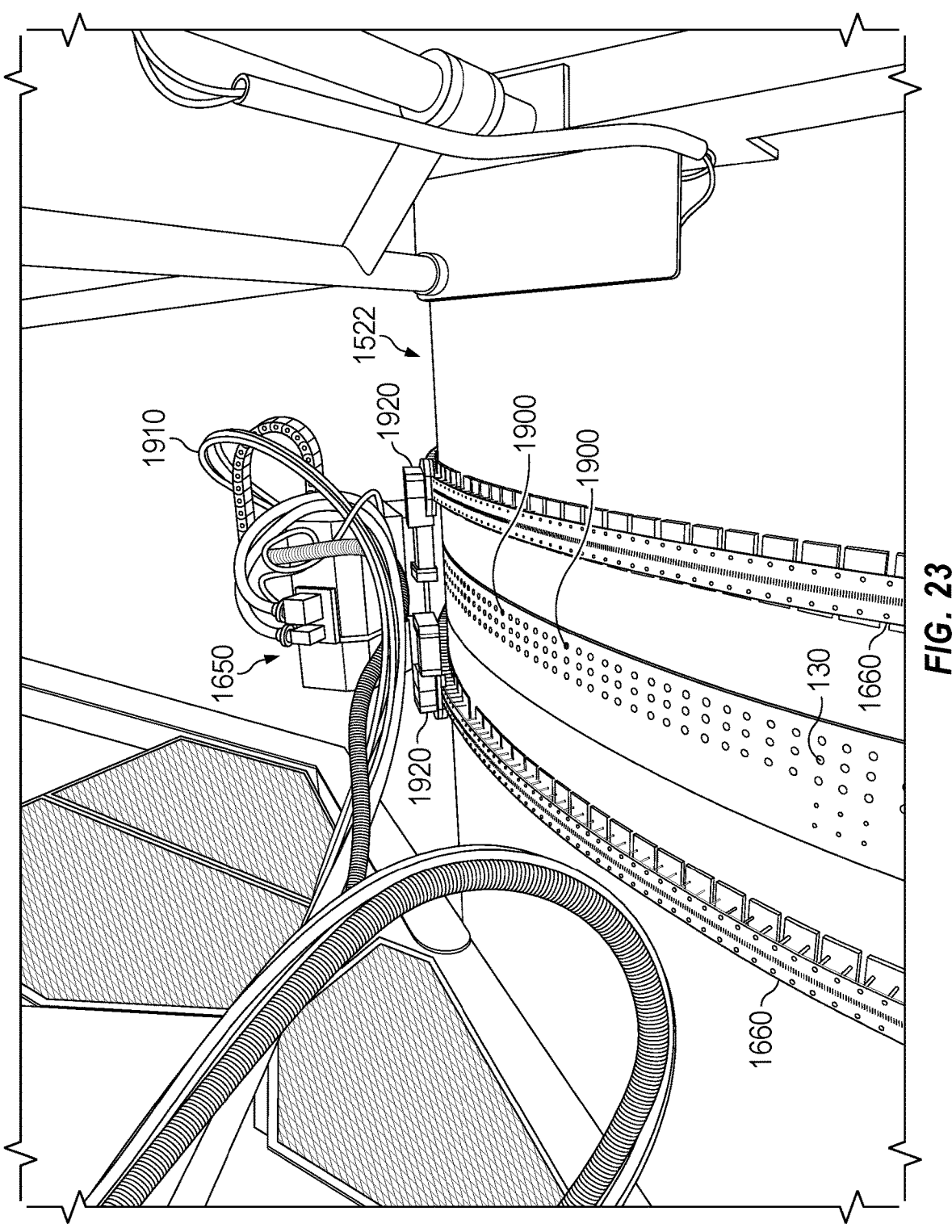
FIG. 23 is a perspective view of the robot moving along flexible tracks mounted on the barrel sections of a fuselage.
Figure 24:
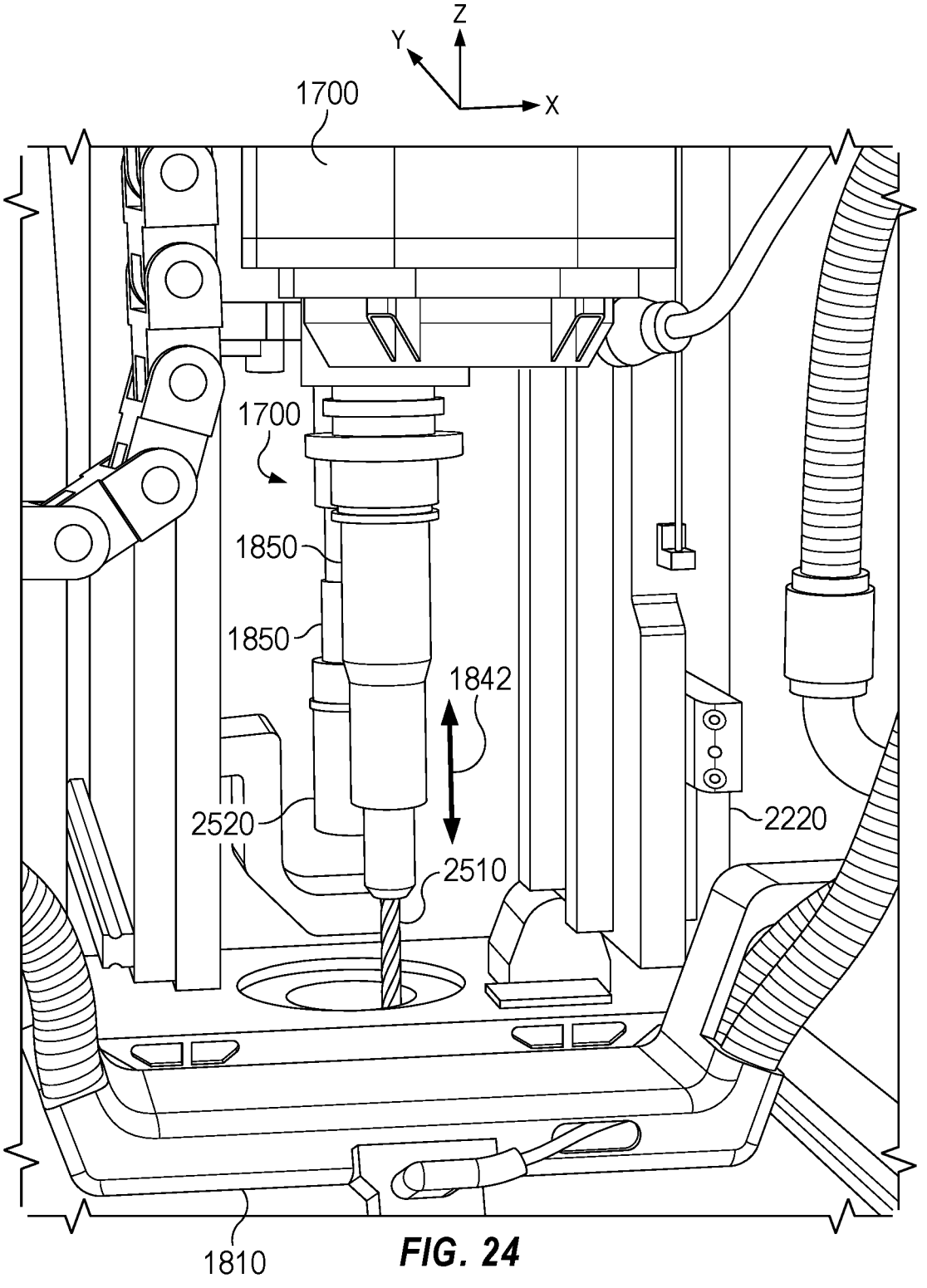
FIG. 24 is a perspective view showing a drill end effector mounted on a slide forming part of the robot.
Figure 27:
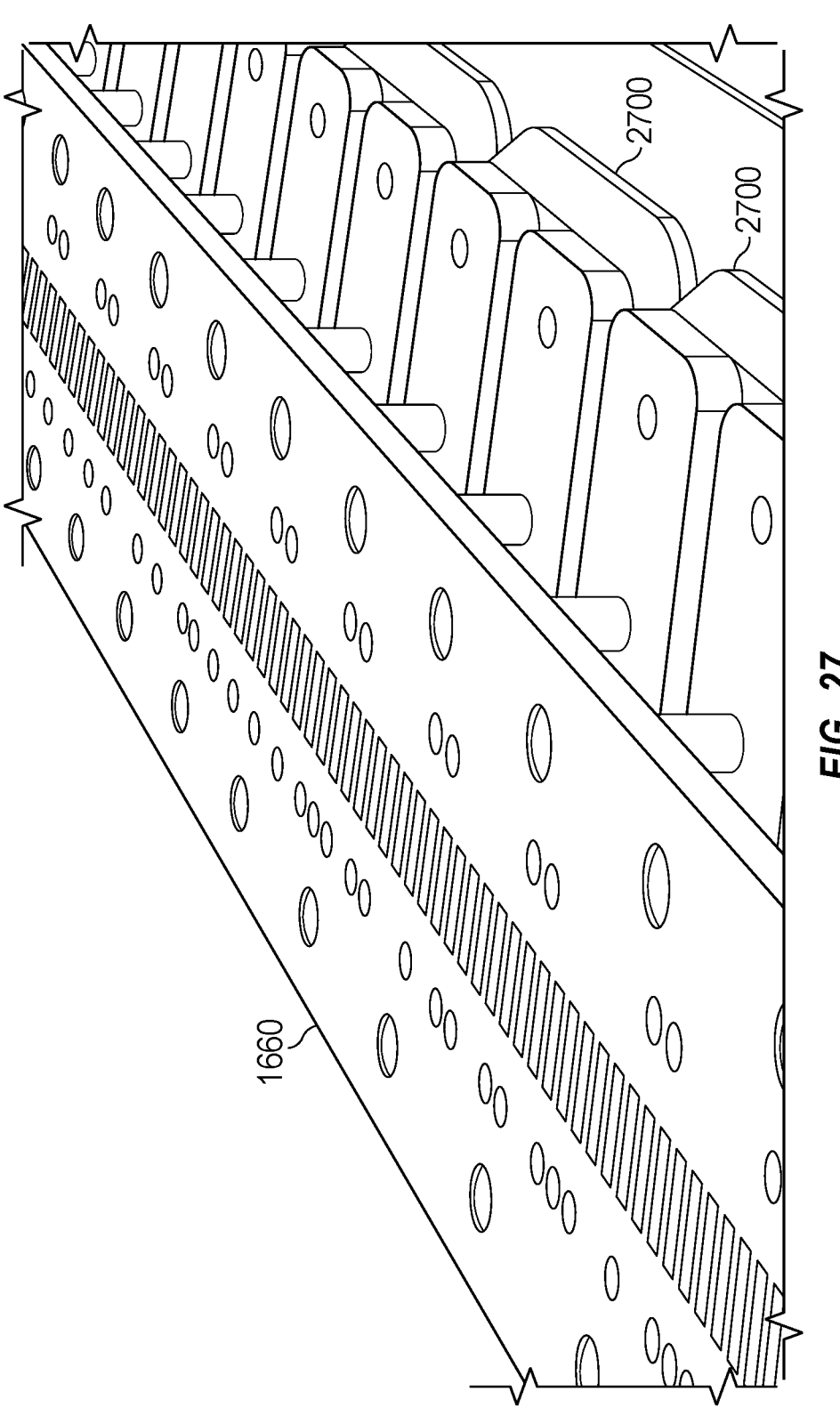
FIG. 27 is a perspective view of one of the flexible tracks, including suction cups.
Figure 28:
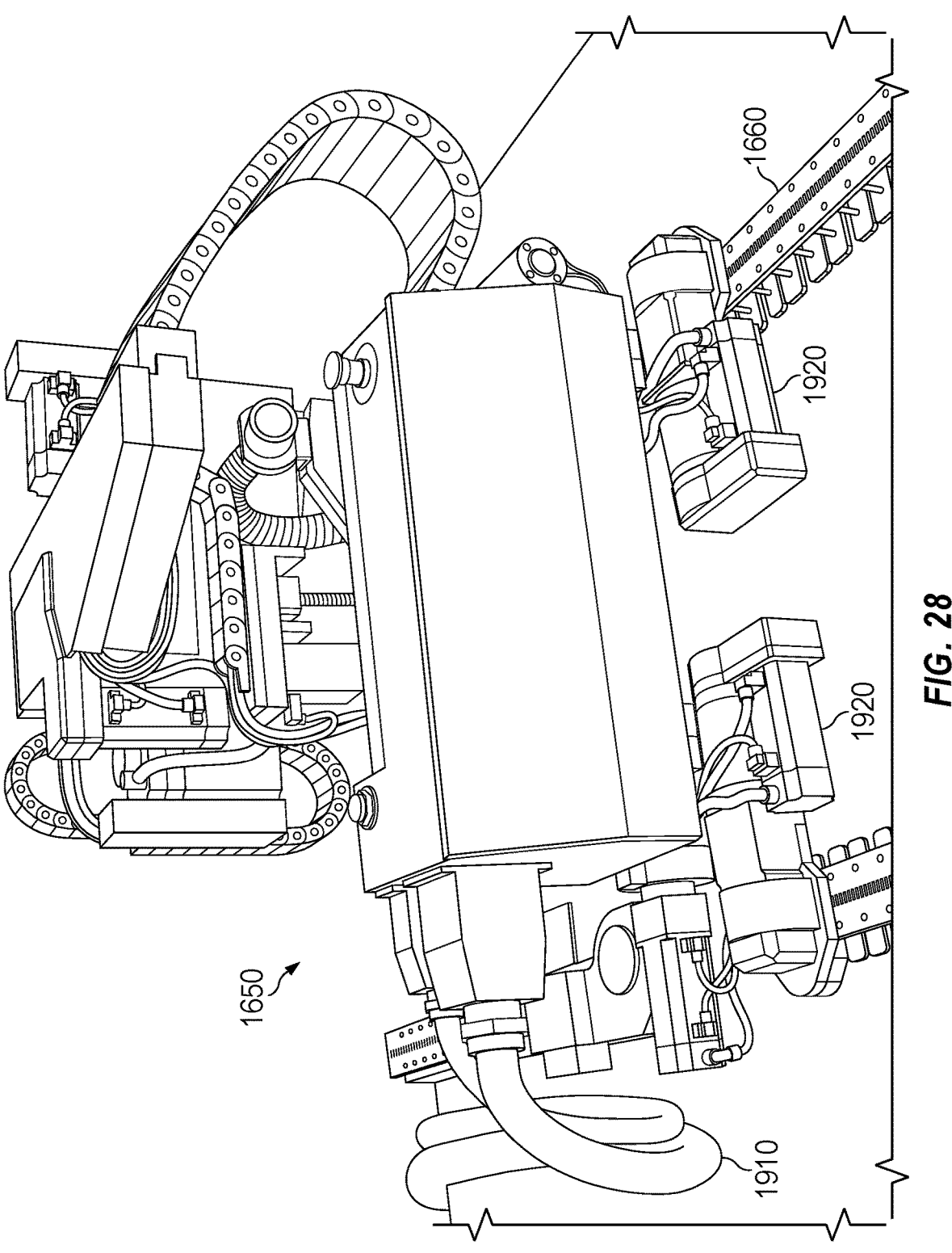
FIG. 28 is a perspective view of another end of the robot.
Figure 29:
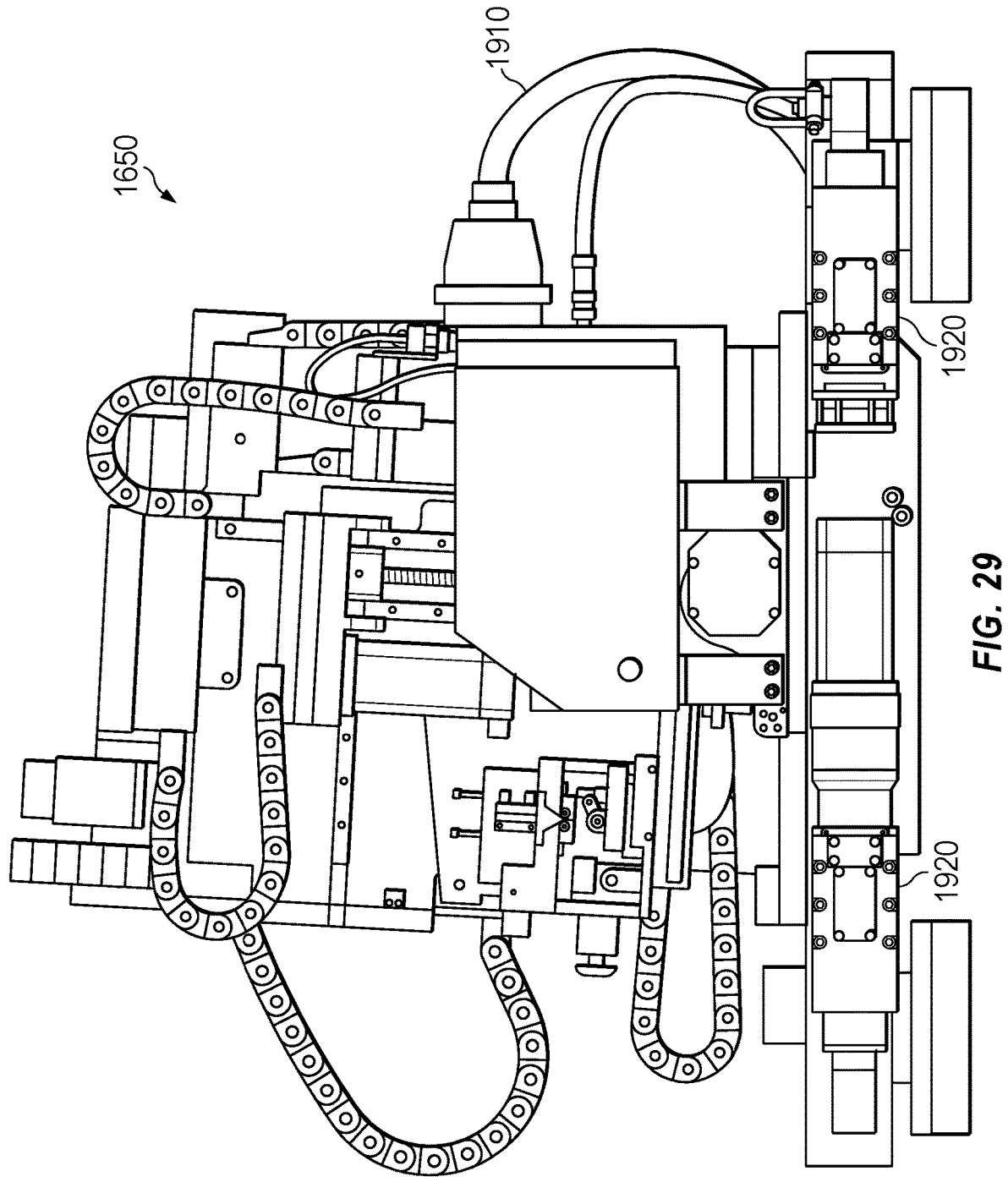
FIG. 29 is a side view of the robot.
Figure 30:
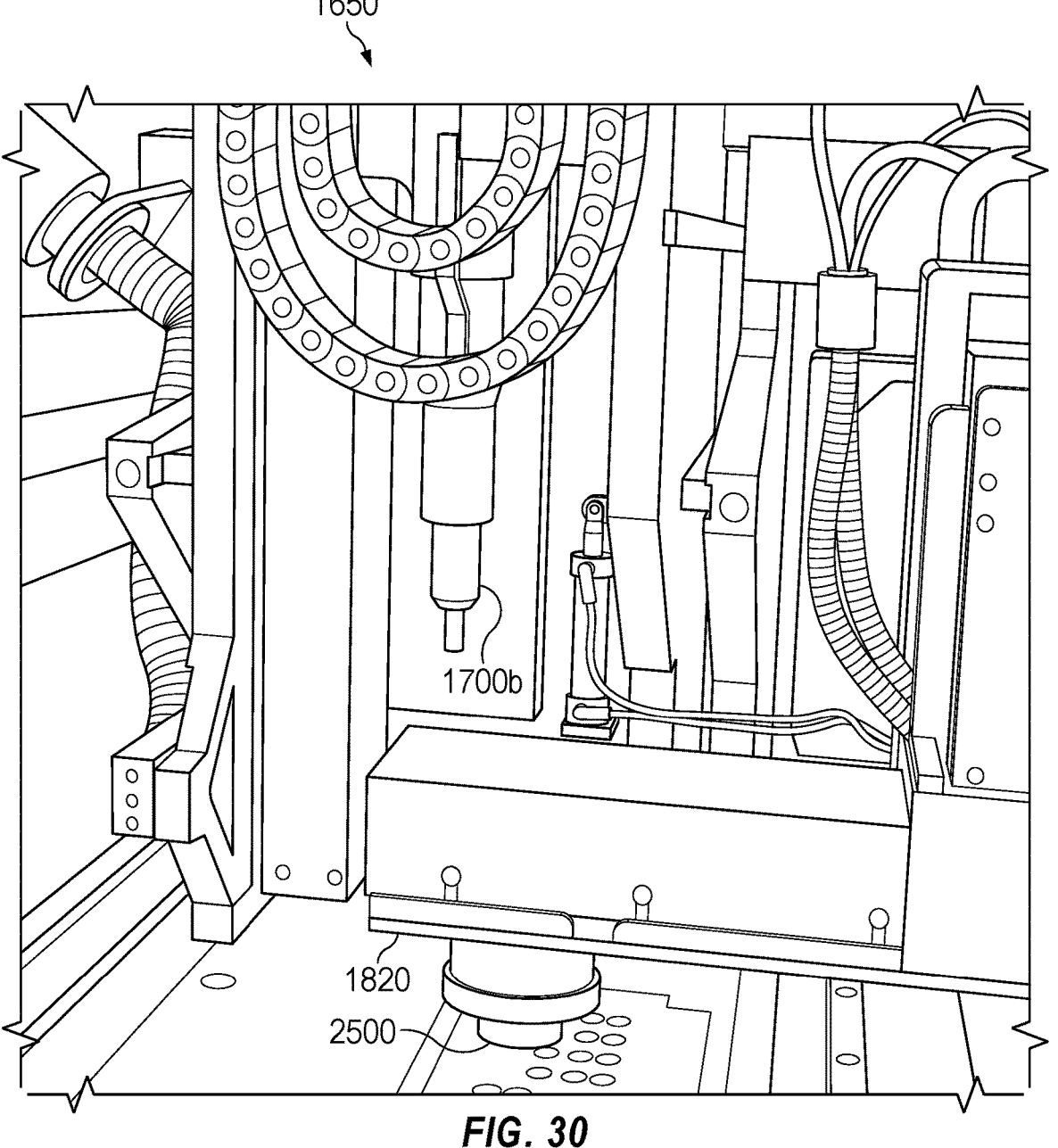
FIG. 30 is another perspective view of the robot showing a clamping foot and a hole measuring end effector for measuring hole diameter.

FIGS. 23-28 illustrate additional details of the robot 1650. A pair of the servo motors 1920 drive the carriage 1810 along the flexible tracks 1660. Umbilicals 1910 couple the robot 1650 with suitable electrical power, compressed air and a controller (FIG. 21) which controls operation of the robot 1650 as well as the end effectors 1700*a*-1700*e*. FIG. 23 shows the robot 1650 having traversed over a portion of a barrel section 1522 in which it has drilled a number of holes 130 and inserted therein temporary fasteners 1900 that tack the barrel sections 1522 together. FIG. 27 shows additional details of one of the flexible tracks 1660. Each of the flexible tracks 1660 is flexible along its length and includes a series of suction cups 2700 which are connected with a suitable vacuum source (not shown) that act through suction to removably hold the flexible track 1660 on the surface of a barrel sections 1522.

Figure 31:
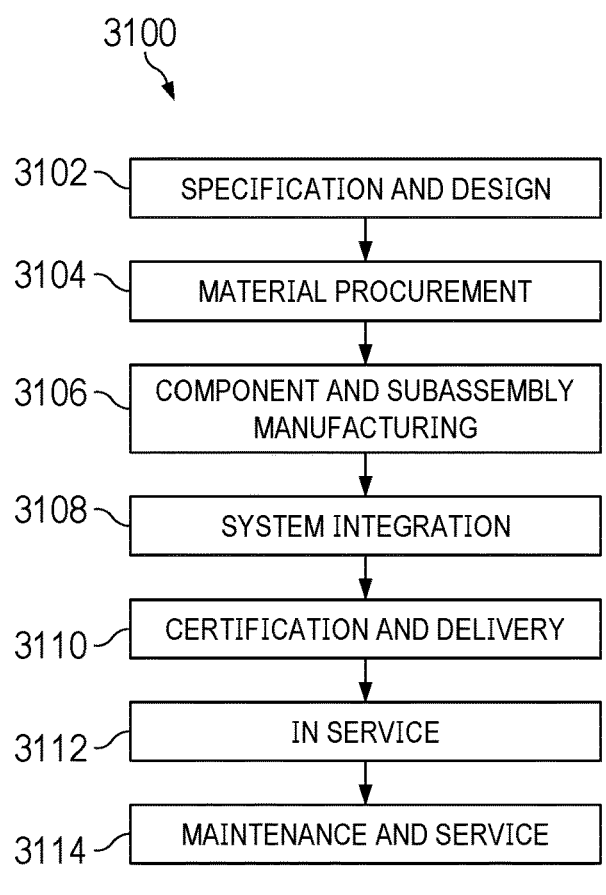
FIG. 31 is a flow diagram of aircraft production and service methodology in an illustrative embodiment.
Figure 32:
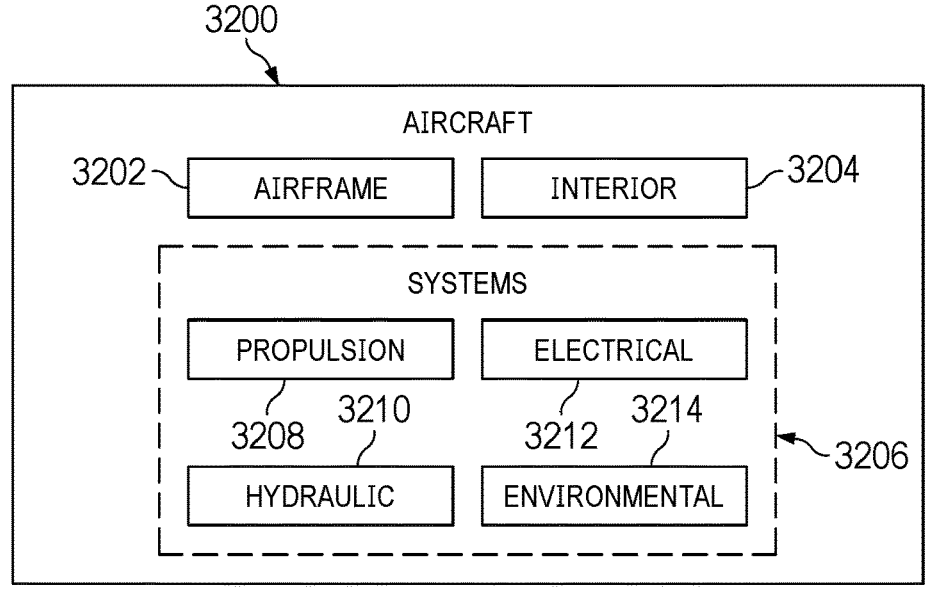
FIG. 32 is a block diagram of an aircraft in an illustrative embodiment.

Referring now to FIGS. 31 and 32, embodiments of the disclosure may be described in the context of aircraft manufacturing and service in method 3100 as shown in FIG. 31 and an aircraft 3200 as shown in FIG. 32. During pre-production, method 3100 may include specification and design 3102 of the aircraft 3200 and material procurement 3104. During production, component and subassembly manufacturing 3106 and system integration 3108 of the aircraft 3200 takes place. Thereafter, the aircraft 3200 may go through certification and delivery 3110 in order to be placed in service 3112. While in service by a customer, the aircraft 3200 is scheduled for routine work in maintenance and service 3114 (which may also include modification, reconfiguration, refurbishment, and so on). Systems and methods embodied herein may be employed during any one or more suitable stages of the production and service described in method 3100 (e.g., specification and design 3102 material procurement 3104, component and subassembly manufacturing 3106, system integration 3108 certification and delivery 3110, in service 3112, maintenance and service 3114) and/or any suitable component of aircraft 3200 (e.g., airframe 3202, systems 3206, interior 3204, propulsion system 3208, electrical system 3212, hydraulic system 3210, environmental system 3214). For example, the disclosed method and system may be used to join together various parts of the aircraft 3200, such as barrel sections of a fuselage or other components of the airframe 3202.

Each of the processes of method 3100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 32, the aircraft 3200 produced by method 3100 may include an airframe 3202 with a plurality of systems 3206 and an interior 3204. Examples of systems 3206 include one or more of a propulsion system 3208, an electrical system 3212, a hydraulic system 3210, and an environmental system 3214. Any number of other systems may be included. Although an aerospace example is shown, the principles of the invention may be applied to other industries, such as the automotive and ship building industries.

As already mentioned, system and methods embodied herein may be employed during any one or more of the stages of the production and service described in method 3100. For example, components or subassemblies corresponding to component and subassembly manufacturing 3106 may be fabricated or manufactured in a manner similar to components or subassemblies produced while the aircraft 3200 is in service. Also, one or more system embodiments, method embodiments, or a combination thereof may be utilized during the subassembly manufacturing 3106 and system integration 3108, for example, by substantially expediting assembly of or reducing the cost of an aircraft 3200. Similarly, one or more of system embodiments, method embodiments, or a combination thereof may be utilized while the aircraft 3200 is in service, for example and without limitation during the maintenance and service 3224. Thus, the disclosed embodiments may be used in any stages discussed herein, or any combination thereof, such as specification and design 3102, material procurement 3104, component and subassembly manufacturing 3106, system integration 3108, certification and delivery 3110, in service 3112, maintenance and service 3114 and/or any suitable component of aircraft 3200 (e.g., airframe 3202, systems 3206, interior 3204, propulsion system 3208, electrical system 3212, hydraulic system 3210, and/or environmental system 3214).

In one embodiment, a part comprises a portion of airframe 3202, and is manufactured during component and subassembly manufacturing 3106. The part may then be assembled into an aircraft in system integration 3108, and then be utilized in service 3112 until wear renders the part unusable. Then, in maintenance and service 3112, the part may be discarded and replaced with a newly manufactured part. Inventive components and methods may be utilized throughout component and subassembly manufacturing 3106 in order to manufacture new parts.

Any of the various control elements (e.g., electrical or electronic components) shown in the Figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method of joining two sheets of material together, comprising:
    moving a robot over the sheets of material to each of a plurality of fastening locations;
    at each of the fastening locations, drilling a pilot hole through the sheets of material;
    automatically measuring an interface gap between the sheets of material at each of the pilot holes using a gap measurement end effector on the robot and by inserting a sheathe through the pilot hole;
    making one or more shims having a size based on the interface gap between the sheets of material, installing the shims in the interface gap; and
    tacking the sheets together using the robot, wherein tacking the sheets together includes:
        automatically drilling full-sized holes in the sheets using a drill end effector on the robot,
        verifying, through the full-sized holes, that any remaining gaps are within a desired tolerance; and
        automatically inserting fasteners in the full-sized holes using a fastener insertion end effector on the robot.

2. The method of claim 1, further comprising:
    verifying the full-sized holes are within a preferred tolerance.

3. The method of claim 2 wherein the verifying the full-sized holes are within a preferred tolerance includes measuring a diameter of the full-sized holes.

4. The method of claim 1, further comprising:
    measuring a size of each of the pilot holes using a hole measurement end effector on the robot.

5. The method of claim 1, wherein the making comprises making one or more shims having a size and thickness based on the interface gap between the sheets of material.

6. The method of claim 1, wherein automatically measuring the interface gap using the gap measurement end effector includes:
    automatically driving a fiber optic probe into the pilot hole;
    determining a profile by scanning walls of the pilot hole via the fiber optic probe; and
    determining whether an interface gap exists at the walls of the pilot hole based on the profile.

7. The method of claim 1, further comprising:
    installing a set of tracks on the sheets; and
    mounting the robot on the set of tracks for movement along the tracks to each of the pilot holes.

8. A portion of an aircraft fabricated according to the method of claim 1.

9. A system for fastening two sheets of material together, comprising:
    a robot that is operated by a controller;
    an end effector on the robot in conjunction with the controller configured to automatically drill pilot holes through the sheets of material;
    an end effector on the robot in conjunction with the controller configured to automatically measure an interface gap between the sheets of material within the pilot holes by inserting a sheathe through the pilot holes, whereby one or more shims having a size based on the interface gap between the sheets of material are made and installed in the interface gap; and
    an end effector on the robot in conjunction with the controller configured to tack the sheets together, wherein tacking the sheets together includes:
        automatically drilling full-sized holes in the sheets,
        verifying, through the full-sized holes, that any remaining gaps are within a desired tolerance; and
        automatically inserting fasteners in the full-sized holes.

10. The system of claim 9, wherein the robot is mounted for movement along a surface of the sheets of material.

11. The system of claim 9, further comprising:
    an end effector on the robot configured to automatically measure a size of the full-sized holes.

12. The system of claim 9, further comprising:
    an end effector on the robot configured to verify the full-sized holes are within a preferred tolerance.

13. The system of claim 9, wherein:
    the robot includes a carriage, and the end effector on the robot configured to automatically measure the interface gap is mounted on the carriage.

14. The system of claim 13, further comprising:

a set of tracks removably mounted on the sheets of material, wherein the carriage is mounted on and movable along the tracks.

15. The system of claim 9, wherein the end effector configured to automatically measure the interface gap includes:

a fiber optic probe configured to scan walls of the pilot holes for interface gaps, an actuator configured to adjust a position of the fiber optic probe within the pilot holes; and a control unit that detects an interface gap at the walls of the pilot hole based on a data from the fiber optic probe.

\*     \*     \*     \*     \*